(12) United States Patent
Ruke

(10) Patent No.: US 9,352,225 B2
(45) Date of Patent: May 31, 2016

(54) SYSTEM AND METHOD FOR PROVIDING A MULTI-PLAYER GAME EXPERIENCE

(75) Inventor: Daniel T. Ruke, Fort Myers, FL (US)

(73) Assignee: GAME NATION, INC., Windermere, FL (US)

( * ) Notice: Subject to any disclaimer, the term of this patent is extended or adjusted under 35 U.S.C. 154(b) by 0 days.

(21) Appl. No.: 13/590,089

(22) Filed: Aug. 20, 2012

(65) Prior Publication Data

US 2013/0045804 A1 Feb. 21, 2013

Related U.S. Application Data

(60) Provisional application No. 61/525,030, filed on Aug. 18, 2011.

(51) Int. Cl.
*A63F 13/12* (2006.01)
*A63G 31/00* (2006.01)
*A63F 13/30* (2014.01)

(52) U.S. Cl.
CPC ............. *A63F 13/12* (2013.01); *A63G 31/00* (2013.01); *A63F 2300/403* (2013.01); *A63F 2300/404* (2013.01); *A63F 2300/5546* (2013.01); *A63F 2300/5573* (2013.01); *A63F 2300/6009* (2013.01); *A63F 2300/609* (2013.01); *A63F 2300/8023* (2013.01)

(58) Field of Classification Search
USPC ........ 463/5, 30, 34, 50–53; 472/1, 14, 16–18, 472/28–30, 35, 43, 44, 57–62; 297/344.23
See application file for complete search history.

(56) References Cited

U.S. PATENT DOCUMENTS

| 4,066,256 | A | * | 1/1978 | Trumbull ........................ 472/60 |
| 4,752,065 | A | * | 6/1988 | Trumbull et al. ............... 472/60 |
| 5,613,913 | A | | 3/1997 | Ikematsu et al. |
| 6,048,271 | A | | 4/2000 | Barcelou |

(Continued)

FOREIGN PATENT DOCUMENTS

WO WO 03093921 A2 * 11/2003 ............. G07F 17/32

OTHER PUBLICATIONS

"Namco Introduces Dead Heat Driver With 42" Monitor" written by Nick Montano, published on or before Apr. 13, 2012 and printed from URL <http://www.vendingtimes.com/ME2/dirmod.asp?sid=&nm=Vending+Features&type=Publishing&mod=Publications::Article&mid=8F3A7027421841978F18BE895F87F791&tier=4&id=92613D8B731E4DDB8721F8ADAE5074D8>, 3 pages.*

*Primary Examiner* — Jason Skaarup
(74) *Attorney, Agent, or Firm* — JP Webb; Jason P. Webb; Danny Y. H. Cheng

(57) ABSTRACT

A system and method for providing a multi-player game experience through a computerized theme-park ride. The system includes a ride control module configured to manage ride control parameters and settings of a computerized theme park ride. The system includes a ride interface module configured to provide an interface to operate and navigate the computerized theme park ride. The ride interface module include a plurality of interface devices. The system includes a ride engine module, including a processor, configured to operate a multi-player game experience. The system includes a communications module configured to bridge communications between the ride engine module, the ride interface module, and the ride control module over a computerized network. The system includes an account module configured to provide player specific information to the ride control module.

20 Claims, 8 Drawing Sheets

(56) References Cited

U.S. PATENT DOCUMENTS

| | | | |
|---|---|---|---|
| 6,060,847 A | 5/2000 | Hettema et al. | |
| 6,079,982 A * | 6/2000 | Meader | 434/29 |
| 6,220,965 B1 * | 4/2001 | Hanna et al. | 463/52 |
| 6,690,673 B1 | 2/2004 | Jarvis | |
| 6,758,746 B1 | 7/2004 | Hunter et al. | |
| 6,761,637 B2 | 7/2004 | Weston et al. | |
| 6,796,908 B2 | 9/2004 | Weston | |
| 6,967,566 B2 | 11/2005 | Weston et al. | |
| 7,396,281 B2 | 7/2008 | Mendelsohn et al. | |
| 7,614,958 B2 | 11/2009 | Weston et al. | |
| 7,674,184 B2 * | 3/2010 | Briggs et al. | 472/128 |
| 7,749,089 B1 * | 7/2010 | Briggs et al. | 472/136 |
| 7,758,435 B2 * | 7/2010 | Henry et al. | 472/128 |
| 7,788,081 B1 | 8/2010 | Kreiner et al. | |
| 7,837,567 B2 * | 11/2010 | Holzberg et al. | 472/59 |
| 7,850,527 B2 | 12/2010 | Barney et al. | |
| 7,896,742 B2 | 3/2011 | Weston et al. | |
| 7,908,467 B2 | 3/2011 | Philyaw | |
| 7,955,168 B2 | 6/2011 | Mendelsohn et al. | |
| 7,971,537 B2 | 7/2011 | Verl et al. | |
| 8,014,768 B2 | 9/2011 | Ackley | |
| 8,088,002 B2 | 1/2012 | Ganz | |
| 8,092,287 B2 | 1/2012 | Purvis et al. | |
| 8,221,220 B2 * | 7/2012 | Ackley et al. | 463/23 |
| 8,330,587 B2 * | 12/2012 | Kupstas | 340/13.26 |
| 2002/0100040 A1 | 7/2002 | Bull | |
| 2003/0106455 A1 * | 6/2003 | Weston | 104/53 |
| 2004/0193489 A1 | 9/2004 | Boyd et al. | |
| 2005/0070258 A1 | 3/2005 | Stanco | |
| 2005/0071225 A1 | 3/2005 | Bortolin et al. | |
| 2006/0252563 A1 * | 11/2006 | Werner | 472/117 |
| 2006/0293103 A1 | 12/2006 | Mendelsohn | |
| 2006/0293110 A1 * | 12/2006 | Mendelsohn | 472/137 |
| 2007/0121957 A1 * | 5/2007 | Trowbridge | A63G 7/00 381/61 |
| 2007/0249425 A1 | 10/2007 | Weston et al. | |
| 2008/0120558 A1 | 5/2008 | Nathan et al. | |
| 2008/0183678 A1 | 7/2008 | Weston et al. | |
| 2008/0274808 A1 | 11/2008 | Walker et al. | |
| 2008/0293499 A1 | 11/2008 | Brewer et al. | |
| 2009/0149265 A1 * | 6/2009 | Holzberg | A63G 31/00 472/59 |
| 2009/0163182 A1 | 6/2009 | Gatti et al. | |
| 2009/0193494 A1 | 7/2009 | Ratliff et al. | |
| 2009/0204905 A1 | 8/2009 | Toghia | |
| 2009/0215469 A1 | 8/2009 | Fisher et al. | |
| 2009/0305799 A1 | 12/2009 | Weston et al. | |
| 2010/0026458 A1 | 2/2010 | Samdahl et al. | |
| 2010/0052858 A1 | 3/2010 | Canora et al. | |
| 2010/0063854 A1 | 3/2010 | Purvis et al. | |
| 2010/0130286 A1 | 5/2010 | Ackley et al. | |
| 2010/0130296 A1 * | 5/2010 | Ackley | A63G 7/00 472/61 |
| 2010/0131947 A1 | 5/2010 | Ackley et al. | |
| 2010/0265848 A1 | 10/2010 | Kummetz et al. | |
| 2010/0273556 A1 | 10/2010 | Briggs et al. | |
| 2011/0229860 A1 | 9/2011 | Leventhal et al. | |
| 2011/0300941 A1 | 12/2011 | Weston et al. | |
| 2011/0312422 A1 | 12/2011 | Ackley | |
| 2012/0051262 A1 | 3/2012 | Clark et al. | |

* cited by examiner

RIDE ENGINE MODULE
28

| CONTROL MODULE 70 | PROCESSOR MODULE 72 |
| --- | --- |
| COMMUNICATION MODULE 74 | STORAGE MODULE 76 |
| GAME EXPERIENCE MODULE 78 | GAME MEDIA MODULE 73 |
| GAME OPERATION MODULE 75 | |

FIG. 7

SYSTEM AND METHOD FOR PROVIDING A MULTI-PLAYER GAME EXPERIENCE

CROSS-REFERENCE TO RELATED APPLICATIONS

This invention claims priority, under 35 U.S.C. §120, to the U.S. Provisional Patent Application No. 61/525,030 to Daniel T. Ruke filed on Aug. 18, 2012, which is incorporated by reference herein in its entirety.

BACKGROUND OF THE INVENTION

1. Field of the Invention

The present invention relates to interactive multi-player games, specifically to a system and method for providing a multi-player game experience.

2. Description of the Related Art

Amusement parks and theme parks are terms for a group of entertainment attractions, rides, and other events in a location for the enjoyment of large numbers of people. An amusement park is more elaborate than a simple city park or playground, usually providing attractions meant to cater specifically to certain age groups, as well as some that are aimed towards all ages. Theme parks, a specific type of amusement park, are usually much more intricately themed to a certain subject or group of subjects than normal amusement parks.

A theme park has landscaping, buildings, and attractions that are based on one or more specific themes or stories. Despite many older parks adding themed rides and areas, qualifying the park as a theme park, the first park built with the original intension of promoting a specific theme. Mechanized thrill machines are a defining feature of amusement parks. Earliest rides include the carousel which was originally developed as a way of practicing and then showing-off expertise at tournament skills such as riding and spearing the ring.

Some improvements have been made in the field. Examples of references related to the present invention are described below in their own words, and the supporting teachings of each reference are incorporated by reference herein:

U.S. Pat. No. 6,967,566, issued to Weston et al., discloses an interactive treasure hunt game is provided. Game participants receive a card, map and/or identification badge configured with an RFID tag, bar-code or a magnetic "swipe" strip or the like. The RFID tag or other identifying device is used to store certain information identifying each play participant and/or describing certain powers or abilities possessed by an imaginary character that the card may represent. Players advance in the game by finding clues and solving various puzzles presented by the game. Players may also gain (or lose) certain attributes, such as magic skills, magic strength, fighting ability, various spell-casting abilities, etc. All of this information is preferably stored on the RFID tag or card so that the character attributes may be easily and conveniently transported to other similarly-equipped play facilities, computer games, video games, home game consoles, hand-held game units, and the like. In this manner, the game can seamlessly transcend from one play environment and/or entertainment medium to the next. U.S. Pat. No. 7,396,281, issued to Mendelsohn et al., discloses a system of interaction between an electronic theme park experience and live theme park interaction and activity earns rewards. The interaction permits for rewards earned in the electronic theme park experience to be redeemed in the live theme park experience and vice versa. The electronic theme park and live activity are interactive in real or delayed time through an Internet connection. Activities on one or both of the live and electronic formats are designed to drive increased player visiting of the live and/or electronic versions. The Virtual Magic Kingdom is a virtual version of Disney's theme parks, specifically the "Magic Kingdom" portion of the theme parks.

U.S. Pat. No. 8,014,768, issued to Ackley, discloses a system and method is provided for remotely controlling and interacting with a multimedia device using a mobile phone. This is accomplished by utilizing cell and mobile phones capable of establishing persistent Internet connections. A software application is provided for the mobile phone which receives inputs entered by a user on the mobile phone's keypad and translates the inputs into commands that are recognized by a multimedia device. For example, the multimedia device may be a television, set top box, or a digital video recorder such as a Tivo or ReplayTV. The software application transmits the data input by the user to the device, either directly, or through at least one central server. Mapping of the commands entered on the mobile phone into commands recognized by the remote device may occur on the phone, at a central server, or at the device itself.

U.S. Pat. No. 7,955,168, issued to Mendelsohn et al., discloses an amusement system has a first path extending through an amusement attraction. Vehicles moving along the path have simulated weapons. Riders in the vehicles shoot at targets along the paths or on the vehicles. A game play system allows remote players to participate in a concurrent simulation of an amusement park or theme park ride, activity or event as the amusement park or theme park ride, activity or event is occurring. The system gathers input from sensors located at the amusement park or theme park ride or activity or event, preprocesses this input, and transfers it to a computer system, which uses this input to create a concurrent simulation of the amusement park or theme park ride or activity or event. A remote game player can then interact with the concurrent simulation by providing input to the concurrent simulation through a user interface. This system combines the excitement of a highly interactive video game with the amusement park or theme park ride or activity or event. Remote game players may additionally compete against each other.

U.S. Patent Application Publication No.: 2008/0274808, by Walker et al., discloses a method and system is provided wherein an event experienced by a player is documented and the documentation of the event is stored (e.g., in association with an indication of the event). One example of an event experienced by a player is an outcome obtained by a player on a gaming device. In such an embodiment the documentation of the event may comprise an image of the player's reaction to the outcome and/or a still or video image of the outcome. In accordance with some embodiments of the present invention a player may subsequently access (e.g., purchase) an output of the documentation. In one embodiment an outcome of a prior game play that was documented is replayed. When the outcome of the prior game play is output, the outcome may be output in a manner that indicates to a viewer that the outcome is an outcome of a prior game play and not an outcome of a current game play.

The inventions heretofore known suffer from a number of disadvantages which include, but are not limited to: being limited in use, being limited in application, being limited in interactivity, being limited is adaptability, being limited in playability, excluding some demographics (especially women and older adults), providing inappropriate content, requiring extensive computer skills/knowledge to use/play, limiting the ability of users to continue to re-play games, restricting games/rides to a particular genre, failing to provide game interaction between children and adults, failing to provide translatable experiences between gamers, failing to provide translatable virtual objects between players, limiting customized game experiences to single player experiences, requiring programming knowledge, requiring consistent game experiences, failing to meaningfully involve ride facilitators in the game experience, and the like.

What is needed is a system and method for providing a multi-player game experience that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available game experiences. Accordingly, the present invention has been developed to provide a system and method for providing a multi-player game experience.

According to one embodiment of the invention, there is a method for providing a multi-player game experience through a computerized theme-park ride. The method may include the step providing a computerized theme park ride that may include a ride engine module that may be configured to operate a multi-player game experience according to predefined game parameters that may have game operation/mechanic and game media (cosmetic) parameters. The method may include the step of managing game media parameters of the multi-player game experience through a ride control module in communication with the ride engine module. The method includes receiving game media parameter selections from a plurality of players through a ride interface module that may include an interface device in communication with the ride control module.

The method may include the step of performing a multi-player game session through the computerized theme-park ride, with the plurality of players wherein the ride engine module, may be using a processor, may present a game experience for each of the plurality of players wherein the game operation parameters may be identical for each player and the game media parameters may be consistent with the received game media parameter selections for each player, respectively, thereby providing a coordinated yet disparate game experience for the plurality of players. The method may also include the step of receiving player information associated with a particular player from an account module. The method may include the step of automatically selecting a game media parameter based on the received player information. The method may include the step of automatically suggesting a game media parameter based on received player information. The method may further include the step of prompting a player for game media parameter selections when an interface device associated with the player approaches within a predefined physical proximity to the computerized theme park ride.

According to one embodiment of the invention, there is a system for providing a multi-player game experience through a computerized theme-park ride. The system may include a ride control module that may be in communication with the communication module and may be configured to manage ride control parameters and settings of a computerized theme park ride. The system may include a ride interface module that may be in communication with the ride control module and may be configured to provide an interface to operate and navigate the computerized theme park ride. The ride interface module may include a plurality of interface devices that may be in communication with a plurality of rider account modules associated with a plurality of players.

The system may include a ride engine module, that may include a processor, that may be in communication with the ride control module and the ride interface module and may be configured to operate a multi-player game experience according to predefined game parameters that may have game operation and game media parameters and to present a game experience for each of the plurality of players wherein the game operation parameters may be identical for each player and the game media parameters may be consistent with the received game media parameter selections for each player, respectively, thereby providing a coordinated yet disparate game experience for the plurality of players.

The ride interface module may include a feedback module that may be configured to receive feedback from a player and may associate the feedback received with a data set associated with a particular game session. The feedback module may be in communication with an account module that may be in communication with the ride interface module and may communicate received feedback to the account module. The ride interface module may proffer a suggested game media selection based on information stored in the account module. The ride interface module may select a game media selection based on information stored in the account module. The ride interface module may prompt a player for game media parameter selections when an interface device associated with the player approaches within a predefined physical proximity to the computerized theme park ride.

The system may also include a communications module that may be in communication with a network and may be configured to bridge communications between the ride engine module, the ride interface module, and the ride control module over a computerized network. The system may include an account module that may be in communication with the ride interface module and may be configured to provide player specific information to the ride control module. The player specific information may include information related to the age of the associated player. The player specific information may include game media parameter preference information.

The interface device may be selected from the group of interface devices consisting of: smart phones, tablets, personal computers, personal digital assistants, kiosks, and terminals. The game media parameters may be selected from the group of game media parameters consisting of: interface skin, game genre, maturity rating, presence of gore, background graphics, background sound, effects graphics, effects sounds, non-player character graphics, non-player character sounds, equipment skins, game board skins, game environment sounds, and game environment graphics. The game operation parameters may be selected from the group of game operation parameters consisting of: object creation/destruction triggers, event creation/termination triggers, player stat increment/decrement triggers, player location/movement rules, non-player location/movement rules, victory/loss conditions, field of view rules, game start conditions, and award conditions.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 7 is a module diagram of a ride engine module of a system for providing a multi-player game experience, according to one embodiment of the invention.

DETAILED DESCRIPTION OF THE INVENTION

Figure 1:
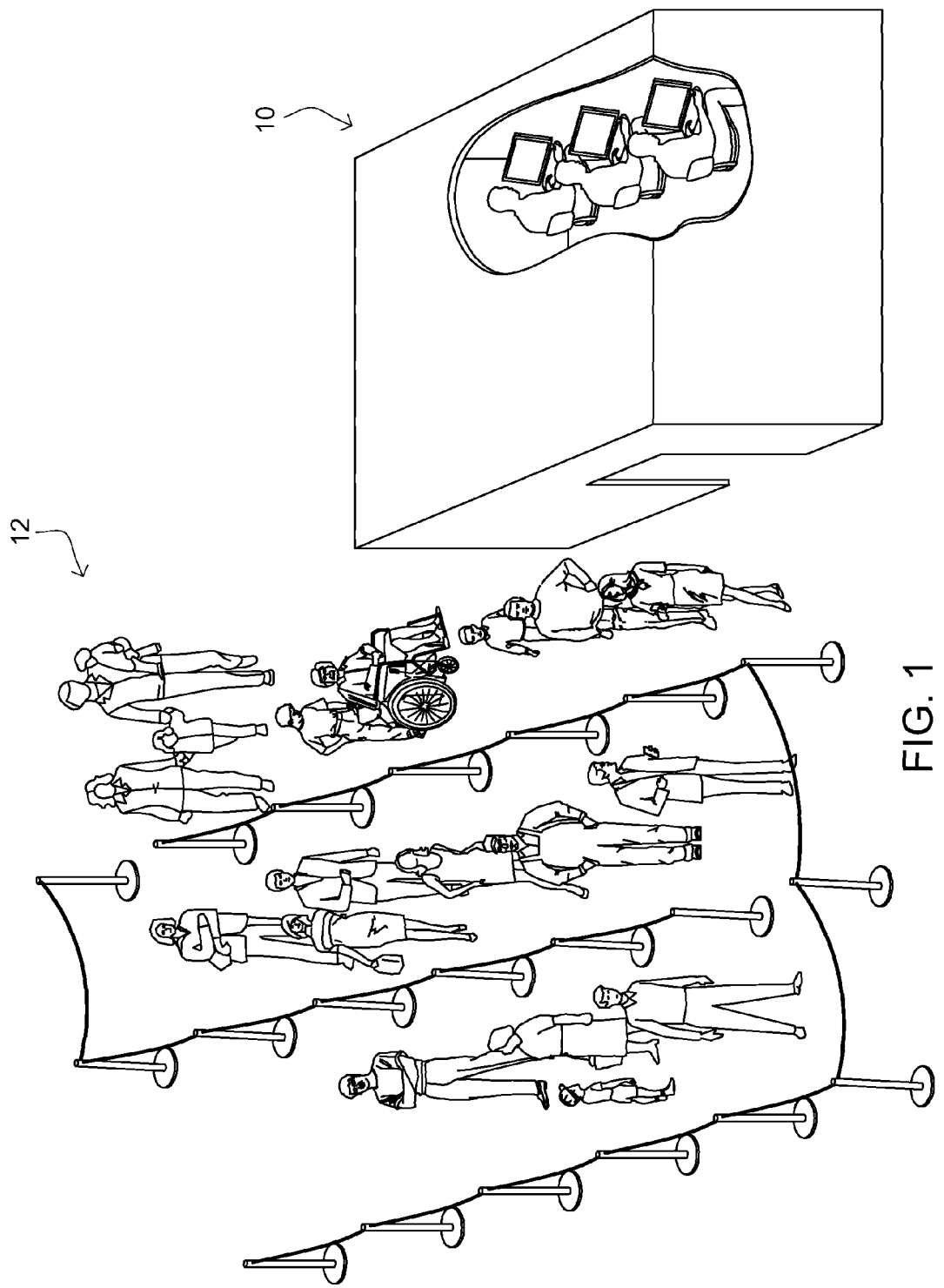
FIG. 1 is a perspective view of a system and method for providing a multi-player game experience in operation in a theme park setting, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

The words "rider," "user," "player," and the like are used synonymously herein and are intended to mean an individual participating in a game experience.

As used herein, the words "object" and "game object" refer to modules that may be created using object-oriented programming and/or languages that permit the same, but not necessarily.

FIG. 1 is a perspective view of a system and method for providing a multi-player game experience, according to one embodiment of the invention. There is shown a plurality of various types of people (disparate people) 12 waiting in line to play a multi-player game experience through a computerized theme park ride 10. The people are participating in coordinated but disparate game experiences that are customized to reflect their particular circumstances and/or characteristics. Further, those waiting to fully participate in the experience (those waiting in line outside the illustrated enclosure) are able to participate to a degree in their experience and in the experiences of others to which they have some connection.

People 12, such as those illustrated, are of different combinations of age, gender, nationality, cultural background, religion, belief systems, family relationships, associations with others, group membership status, and etc. Accordingly, their needs and wants with respect to entertainment are disparate, different in kind. However, the desire to experience challenge, excitement, achievement, and etc. is substantially universal to the human experience, even if expressed to varying degrees by individuals.

Further, the desire to: collaborate, coordinate, form groups, play together, and etc. is also substantially universal, even if expressed to varying degrees by individuals. Therefore, groups of people and individuals visit theme parks in an effort to satisfy those universal desires. But, satisfaction of those desires is limited by the theme park's ability to provide a broad spectrum of interesting activities and further limited by the density to which such a park may deploy such resources. Thus, there are necessarily times and places where the specific desires of specific individuals within the group of visitors are not having a positive or fulfilling experience.

The present invention includes a system and a method for providing a multi-player game experience that is coordinated between the players yet disparate in the presentation thereof 10. Accordingly, those factors (game operations/mechanics) which drive fulfillment of the wants and needs that are substantially similar across individuals are provided in a manner that is substantially similar, while those factors (game media or cosmetic) which are substantially different between individuals may be presented in a different manner without interfering with operation of the game mechanics.

Figure 2:
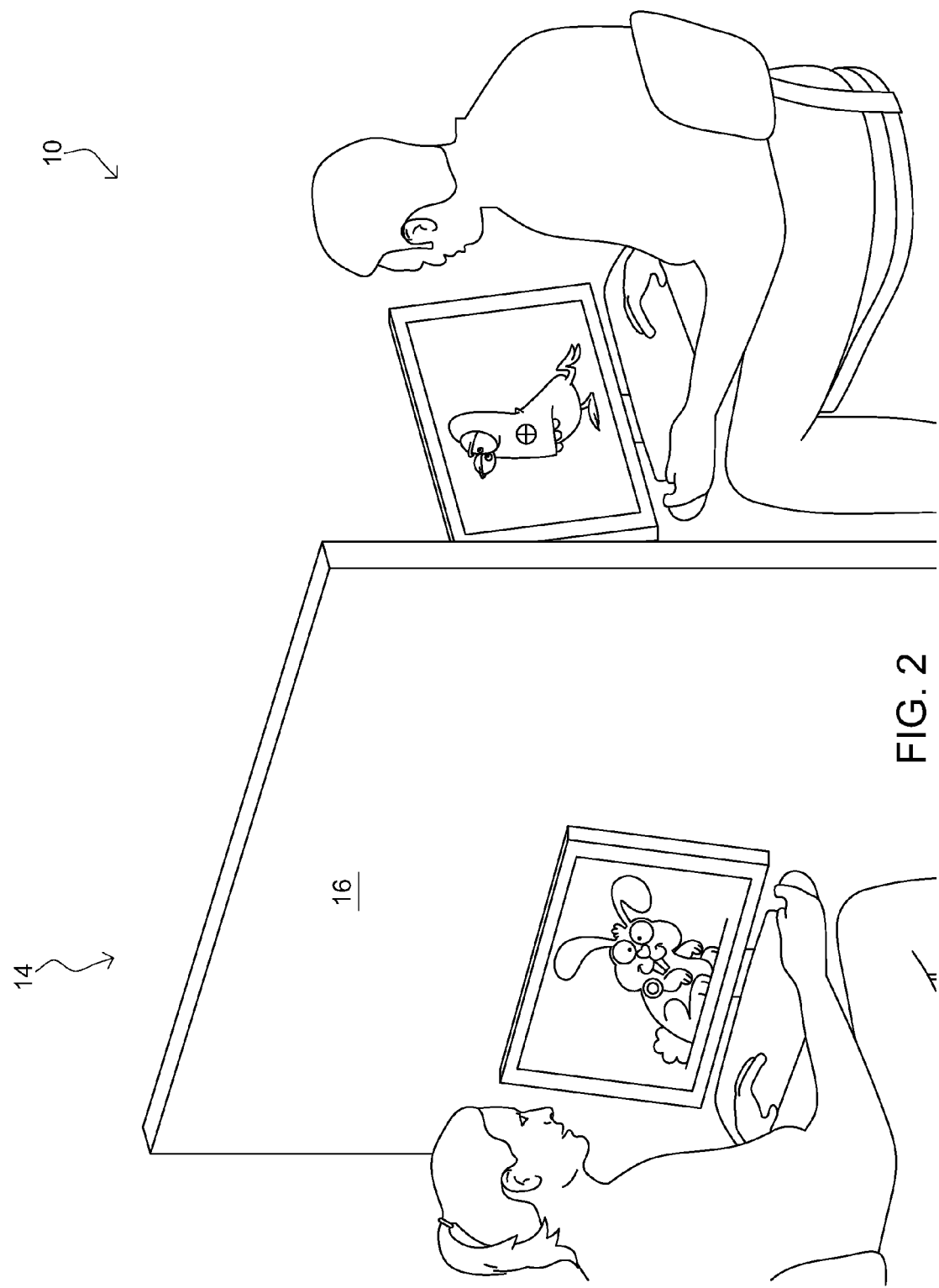
FIG. 2 is a perspective view of a system and method for providing a multi-player game experience for a pair of disparate players playing a multiplayer game together, according to one embodiment of the invention.

FIG. 2 is a perspective view of a system and method for providing a multi-player game experience, according to one embodiment of the invention. There is shown a pair of players 14 playing a coordinated multi-player game experience through a computerized theme park ride 10. The illustrated pair of players 14 are separated by a media blocking structure/device 16, in the illustration a simple wall the blocks line of sight between the players. Further, the actual screen representation of game objects for each player is substantially similar with regards to the operation/playing of the game, but the graphical elements are cosmetically different. In the illustrated example, the screen of the girl shows a bunny, while the screen of the boy shows a stylized monster.

As a non-limiting example, the two players may be playing a multiplayer first person shooter game using a single game engine, such as but not limited to the first-person shooter game engines including and/or similar to Unreal Engine 3 by Epic Games of Cary N.C., Dunia Engine by Kirmaan Aboobaker, CryEngine 2 by Crytek of Frankfurt Germany and/or the Source engine by Valve Corporation of Bellevue Wash. In the illustration, the players are playing a game wherein the view control and position of the players in the game environment is either scripted (out of control of the players) or otherwise locked so that the players experience substantially the same view positions and orientations throughout game-play. Further, actions that the players take towards game objects (generally towards game objects on the screen) may result in creation, destruction, and/or transformation of game objects during the game experience. This creation, destruction, and/or transformation of game objects is generally experienced, in one way or another, by both players regardless of which player triggers the change.

In one non-limiting example, one player may target and strike a game object, which may cause the game object to transform into a new game object for a time and then be removed. In the case of the boy's screen, this may result in a monster exploding with gore and then the game object being removed as the image of the monster fades or falls out of view. That exact same moment, the girl's screen may show a rescue ray transporting the bunny to a place of safety, the bunny eventually being removed as a game object and no longer being displayed on the screen. Accordingly, an older brother and younger sister may play the exact same game (as far as game mechanics are concerned) while having vastly different sensory experiences that are customized to their specific characteristics/circumstances. In this example, the players are experiencing substantially different cosmetic experiences, but the game mechanics are substantially the same (not clearly perceptibly different between players) and the experience is also coordinated in that the outcome (win, lose, high score, low score, progression through levels, etc.) and process for achieving that outcome are substantially related, and in the case of the described game, substantially the same.

In general, a difference between a game media and game operations is that game media is experienced by the player but does not substantially influence the operation of the game so that a game may progress in a still coordinated and/or still synchronized manner despite differences in game media experienced by players, while game operations do substantially influence operation of the game and variations in game operation will substantially later the game so that the game is no longer still coordinated and/or synchronized. It is desirable that groups of players be able to face and overcome challenges together and have a group experience of success and/or failure while receiving a customized sensory experience for each player that is suited to their characteristics. This allows people with huge differences in their backgrounds, life experiences, positions in life, relationships, issues, problems, taboos, moral standards, and etc. to play together without those differences playing a significant role in the combined experience.

While the illustrated example relates to first-person shooter games, and specifically to a particular kind of first-person shooter game, such an experience may be provided in a great variety of game types, including but not limited to computerized: first person shooters, strategy games, puzzle games, simulators, board games, role-playing games, games of chance, educational games, party games, war-games and the like and combinations thereof. The experience may also be present in computerized games that are cooperative player versus computer, cooperative player versus player, full player versus player, and the like and combinations thereof. Additionally, the game interfaces and roles played by each player and the actual game mechanics experienced by each player may be may be substantially different while still being a coordinated game.

As a non-limiting example, Player A may be playing a role as a sniper and may experience the game as a 1950s hostage crisis where Player A is required to "shoot the bad guys" that appear as Player B flushes them out of their hiding locations in the sewers. Meanwhile Player B may be playing a role as a mole (the animal) digging through a psychedelic styled underground tunnel system and pushing vegetables up out of the way (which appear as "bad guys" to Player A) and avoiding steel stakes that appear (the missed shots of Player A). The interface for Player A may be operated according to a selection for "mild" interface feedback, while the interface for Player B may be operated according to a selection for "severe" interface feedback. Thus, the recoil generated by the system for Player A to experience at each shot may be slight or merely a represented by a sound; while, Player B colliding with a vegetable may be expressed by the system with strong action from a motor coupled to Player B's chair. Accordingly, the players have synchronized and coordinated game-play while having meaningfully different game experiences, roles, interfaces, and sensory experiences.

In one embodiment, this may be accomplished by dynamically setting game object characteristics that are typically fixed and by permitting game object characteristics to be pluralized, such as but not limited to pluralized according to the number of players. In particular, game objects generally have associated media files (skins, sounds, names, descriptions, motor control script, etc.) that are called by the system as needed to be displayed/played/run/etc. for the user at the appropriate times. Such game objects may include media file indexes, pointers, or other tools for instructing a system to call a particular file. Wherein a system, during initialization of the game or during game play, is able to interact with the game object in a manner that the player and/or the player's setting/characteristic/media selection/etc. is communicated between the game object and the system, the system may then be given sufficient instructions to find the relevant media file to display/play/run/etc.

In another non-limiting example, the game object may be as typical, but instead of "pointing" to a media file, there may be a media library that may be indicated and the player selection may be retrieved using a query of the media library. In particular, the game object, instead of pointing to an image file that includes all the information needed to create the "skin" of the game object, the game object may point to an image library that includes a great variety of "skins" that have searchable characteristics, including but not limited to presence of gore, adult rating, applicable genre, colors included, color scheme, style, and etc. Accordingly, either during game initialization (to speed game play) and/or during game-play (to permit in-game changes) the system may query the library using one or more search characteristics to obtain one or more suitable media files to be used. Where multiple media files are retrieved, there may be one or more rules, automatic settings, structured/random processes, and/or the like and/or combinations thereof for selecting a single file or for using multiple files together. As a non-limiting example, the system may randomly select an appropriate file or may select a file that has common characteristics with another previously selected file.

Further, while some game objects are merely created/destroyed during the game, some game objects may become virtual possessions or characteristics associated with player accounts. Accordingly, the expression of these objects may continue to be variable and based on selections by the player and or characteristics of the player as recorded in their user accounts. A particular expression may persist or may transform on acquisition or transfer of the object. As a non-limiting example, Player A earns a silver badge of honor playing a cowboy-styled game. This badge may remain as a silver badge outside the game experience or it may be expressed as a holograph-style multicolored trophy because the default style setting for that particular player may be set to futuristic styles. The badge object may retain information (or information of the original graphic/style setting may be otherwise retained by the system) about its original expression even after transformation to a newer setting. If the badge object (then expressed as a trophy) is later transferred to another player, the badge object may retain its present expression (trophy), may revert to a previous expression (silver badge), or may transform to a new expression if the recipient "chooses" (either by a default setting, an actual selection by the player, or a characteristic of the account that the player may have no control over) to an expression such as but not limited to a red daisy that may be placed in a virtual garden "owned" by the player. It may be that some expressions are only possible to achieve through transformations of game objects. As a non-limiting example, the red daisy expressed game object may only be possible to select to express if specific requirements are met (on transfer only, on second or higher transformation only, only if transforming from a particular genre/style to another particular genre/style, on combination of objects, and etc., and combinations thereof). Accordingly, there may be one or more rules, scripts, etc. that may define possible expressions and it may be that selections are possible only within the defined rules for expression.

In this application, the ability of the system to select between difference media expressions is discussed. Such selections may be based on direct user input (offer the user choices and select based on input from user through an interface device); based on characteristics of a user account that are not changeable by the user (age limited rating selections, game progression, etc.); characteristics of a user account that are changeable by the user (genre preferences, color scheme preferences, background music preferences, etc.); based on selections made by a ride facilitator (employee of the theme park who may have control over particular aspects of the game experience and such control may be variable from employee to employee and may be earned based on gameplay by the employee or based on other factors such as job performance, time employed, and etc. such that players may only be able to experience certain sensory experiences when a particular employee/facilitator is operating the game, thereby creating "celebrity" employees); based on group characteristics (average or most prevalent user defaults among a group, average or highest voted selection for a group, specific hard-set preference of a group, etc.) wherein a group may be a guild, family, business, set of players playing a specific game or group of games, group identified by a specific characteristic (for example a player may indicate that they belong to a particular religion or other group and the group leader may they be enabled to make specific default selections for the members of the group that the group members may or may not be able to override—thus users may be free to make selections knowing that the group standards are pre-enforced, wherein forbidden selections may not even be offered or visible to members of the group); and etc. Selections by one group or individual (player, game facilitator, group leader, etc.) may automatically increase and/or decrease selection opportunities, lists, options, and etc. by other groups or individuals. As a non-limiting example, a particular theme park employee (and/or player, group, etc.) may be the only account(s) that can enable other players to select a branded set of game media for a particular game/ride and special events may be hosted by the theme park and/or the owner of the associated brand. Specifically implemented, there may be a sports themed night where game media associated with a particular sports team brand may be available for selection by players because of the presence of a particular person/group in the theme park. On other nights that specific person/group may still play without selecting to allow other players to access that media.

Such selections may be made through a device remote from the game/ride, such as but not limited to through a smartphone, tablet and/or kiosk. Such selections may be prompted of a player when they are in line waiting to play or otherwise proximate to the game. Such may be implemented by various methods, including but not limited to placing QR codes that link to a selection screen associated with a specific ride/game on posts holding up a shade pavilion for those in line, using GPS positioning to determine when a player is proximate to a particular game and popping up a selection screen. Selections that are user selected may be selected through the selection screen/interface. Selections that are automatically selected by the system (group default selections, age restrictions, ride facilitator settings, etc.) may be automatically selected before presenting selection options to the player in order to better inform the player of what may be selected.

Accordingly, a computerized game system that is operating according to one or more embodiments described herein may be able to provide a highly customized and disparate game experience to a group of players while still providing a coordinated and/or synchronized game experience to the same. One or more modules, named herein as a module or not, may be used in such a computerized game system to provide one or more of the benefits, features, options, possibilities, functions, operations, and the like described herein. Such modules may be in sufficient communication with each other so as to provide the associated benefits, features, options, possibilities, functions, operations, and the like described herein as one of ordinary skill in the art would recognize would be appropriate for the performance thereof.

Figure 3:
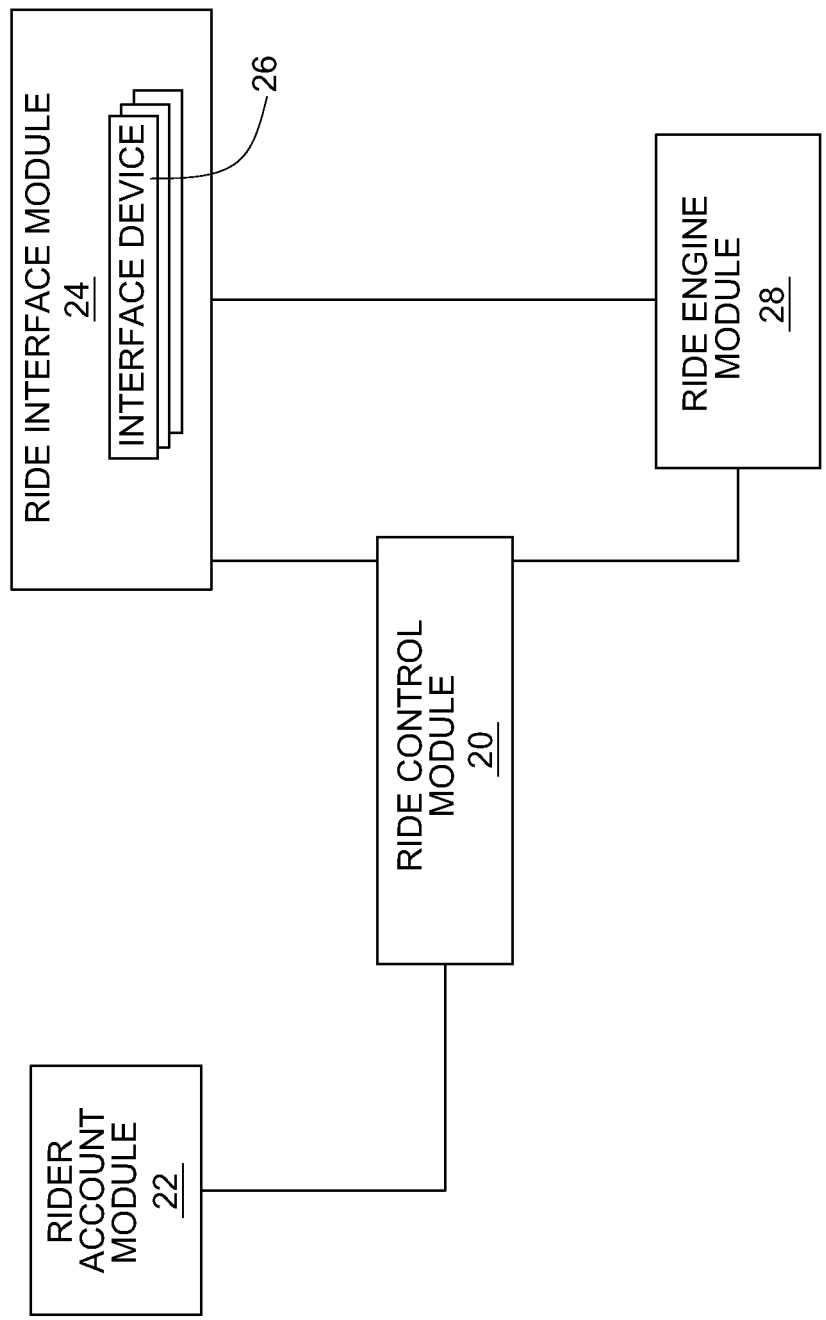
FIG. 3 is a module diagram of a system for providing a multi-player game experience, according to one embodiment of the invention.

FIG. 3 is a module diagram of a system for providing a multi-player game experience, according to one embodiment of the invention. There is shown a ride control module 20 in communication with a rider account module 22, a ride interface module 24 including a plurality of interface devices 26, and a ride engine module 28. Advantageously, such a system is able to provide multiplayer game experiences to a plurality of players wherein each player's experience may be customized while still retaining a degree of coordination and/or synchronization of a game experience between players.

The illustrated ride control module 20 may be in communication with a communication module and/or one or more other modules described herein. It is configured to manage ride control parameters and settings of a computerized theme park ride. Final designation of game settings, official change of settings by players (or automatically), instructions about game settings/parameters, and the like may be stored in originated from, sourced by, or otherwise managed by the ride control module. Decisions about conflicting communications and/or decisions about order of operation in the selection of game parameters/settings may be made by the ride control module and instructions to other modules may be originated therefrom.

The illustrated ride interface module 24 may be in communication with the ride control module and is configured to provide an interface to operate and navigate the computerized theme park ride. The ride interface module 24 includes a plurality of interface devices 26 that are in communication with a plurality of rider account modules 22 associated with a plurality of players. Such interface devices are configured to permit players to interact with the system, including but not limited to making game media selections. Interface devices include, but are not limited to: smartphones, tablets, personal computers, kiosks, ride interfaces, terminals and the like and combinations thereof. Game media parameters are not limited to but may be selected from the group of game media parameters consisting of: interface skin, game genre, maturity rating, presence of gore, background graphics, background sound, effects graphics, effects sounds, non-player character graphics, non-player character sounds, equipment skins, game board skins, game environment sounds, and game environment graphics. The game operation parameters are not limited to but may be selected from the group of game operation parameters consisting of: object creation/destruction triggers, event creation/termination triggers, player stat increment/decrement triggers, player location/movement rules, non-player location/movement rules, victory/loss conditions, field of view rules, game start conditions, and award conditions.

The illustrated ride interface module 24 is configured to receive interaction with one or more players of a game and may include a feedback module that may be configured to receive feedback from a player and may associate the feedback received with a data set associated with a particular game session. The feedback module may be in communication with an account module that may be in communication with the ride interface module and may communicate received feedback to the account module. The ride interface module may proffer a suggested game media selection based on information stored in the account module. The ride interface module may select a game media selection based on information stored in the account module. The ride interface module may prompt a player for game media parameter selections when an interface device associated with the player approaches within a predefined physical proximity to the computerized theme park ride.

The illustrated ride engine module 28 may include a processor and may be in communication with the ride control module 20 and the ride interface module 24 and is configured to operate a multi-player game experience according to predefined game parameters. Such game parameters include game operation parameters and game media parameters. Accordingly, the ride engine module is able to present a game experience for each of the plurality of players wherein the game operation parameters may be identical for each player and the game media parameters may be consistent with the received game media parameter selections for each player, respectively, thereby providing a coordinated yet disparate game experience for the plurality of players. The ride engine module may include controls and devices necessary for operation of the game/ride, including but not limited to ride chassis, steering devices, safety equipment, display devices, motors, rumble devices, speakers, tracks, engines, and the like and combinations thereof that may be present in theme park rides.

The rider account module 22 is in communication with the ride control module 20 and may be in communication with the ride interface module 24 and is configured to provide player specific information to the ride control module. The player specific information is not limited to but may include information related to the: age, race, gender, preferences, group affiliation, achievements, virtual assets, physical assets, contact information, and etc. of the player. The player specific information may include game media parameter preference information such as but not limited to preferences associated with: genre (future, cyber-punk, fantasy, middle ages, ancient, psychedelic, corporate, etc.), violence rating, nudity/adult rating, gore rating, language, languages, color schemes, etc.

The illustrated system may also include a communications module that may be in communication with a network and may be configured to bridge communications between the ride engine module, the ride interface module, and/or the ride control module over a computerized network.

Figure 4:
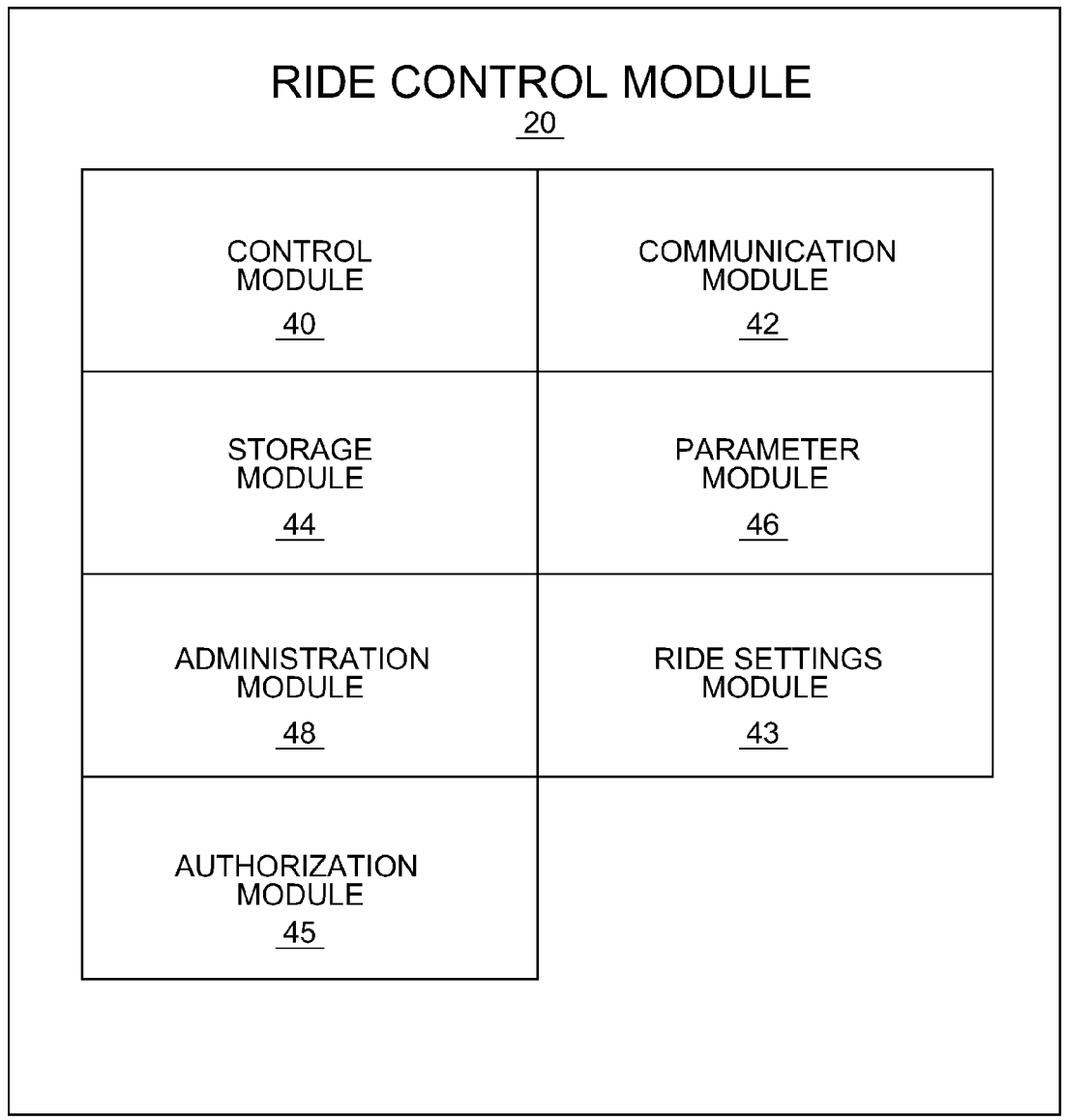
FIG. 4 is a module diagram of a ride control module of a system for providing a multi-player game experience, according to one embodiment of the invention.

FIG. 4 is a module diagram of a ride control module of a system for providing a multi-player game experience, according to one embodiment of the invention. There is shown a ride control module 20 including a control module 40, a communication module 42, a storage module 44, a parameter module 46, an administration module 48, a ride settings module 43, and an authorization module 45.

The illustrated ride control module 20 is configured to manage ride control parameters and settings of a computerized theme park ride of a game experience. The ride control module 20 includes a control module 40 configured to provide operational controls and instructions to the modules and components of the computerized theme park ride. The control module 40 is in communication with the modules and components of the computerized theme park ride and is configured to provide operational instructions and commands thereto. Non-limiting examples of a control module may be a control module described in U.S. Pat. No. 5,430,836, issued to Wolf et al.; or a control module described in U.S. Pat. No. 6,243,635, issued to Swan et al. which are incorporated for their supporting teachings herein. A control module may include but is not limited to a processor, a state machine, a script, a decision tree, and the like.

The illustrated ride control module 20 includes a communication module 42 in communication with the control module 40 and configured to provide communication capabilities to the modules and components of the computerized theme park ride. Such communication may be wireless, especially in regards to communications within a theme or amusement park or during a game experience. The communication module may also be configured to provide a secure method of communication with a computerized theme park ride and a plurality of players over a network. Non-limiting examples of a communication module may be but not limited to: a communication module described in U.S. Pat. No. 5,307,463, issued to Hyatt et al.; or a communication module described in U.S. Pat. No. 6,133,886, issued to Fariello et al. which are incorporated for their supporting herein.

The illustrated ride control module 20 includes a storage module 44 in communication with the various modules and components of the ride control module 20. The storage module 44 is configured to store data transferred through the ride control module 20 and the modules and components thereof.

The storage module 44 is configured to securely store ride control data along with authentication and authorization codes to access the ride control module. The storage module 44 is configured to store data from the ride control module 20, including data from the players playing a game experience, data from players waiting to play a game experience, data from players after playing a game experience through a computerized theme park ride, etc. Data storage modules may be databases or data files, and the memory storage device may be hard drives or tapes. A non-limiting example of a data base is Filemaker Pro 11, manufactured by Filemaker Inc., 5261 Patrick Henry Dr., Santa Clara, Calif., 95054. Non-limiting examples of a storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

The illustrated ride control module 20 includes a parameter module 46 in communication with the control module 40 and configured to set, control, and manage parameters for a computerized theme park ride. The parameter module 46 is configured to set ride parameters for each individual player playing a multi-player game experience through the computerized theme park ride. The parameter module 46 is configured to store ride parameters for each individual player in the storage module for future use or reference. The parameter module 46 is configured to receive game operation and game media parameters from each player before playing the game experience through the computerized theme park ride. Non-limiting examples of a parameter module may be a parameter setting system as described in U.S. Pat. No. 8,116,888, issued to Tsai; or a parameter setting device as described in U.S. Pat. No. 7,602,733, issued to Huang et al., which are incorporated for their supporting teachings herein.

The illustrated ride control module includes 20 an administration module 48 in communication with the control module 40 and configured to provide operational controls and administrative instructions to the modules and components of the ride control module 20. The administration module 48 is in communication with the modules and components of the ride control module and is configured to provide operational and administrative instructions and commands thereto. The administration module 48 is configured to provide administrative capabilities to the modules and components of the ride control module. Non-limiting examples of an administration module may be a control module described in U.S. Pat. No. 5,430,836, issued to Wolf et al.; or a control module described in U.S. Pat. No. 6,243,635, issued to Swan et al. which are incorporated for their supporting teachings herein. An administration module may include but is not limited to a processor, a state machine, a script, a decision tree, and the like.

The illustrated ride control module 20 includes a ride settings module 43 in communication with the control module 40 and the parameter module 46. The ride settings module 43 is configured to manage ride settings for each player playing a game experience through a computerized theme park ride. The ride settings module 43 is configured to set parameter limitations for each player based upon player data or player profile data. Non-limiting examples of a ride settings module may be a system as described in U.S. Pat. No. 7,941,267, issued to Adamczyk et al.; or a system as described in U.S. Pat. No. 7,319,924, issued to Ampunan et al., which are incorporated for their supporting teachings herein.

The illustrated ride control module 20 includes an authorization module 45 in communication with the control module 40 and the administration module 48. The authorization module 45 is configured to provide security settings to the ride control module 20 and the module and components thereof. The authorization module 45 is configured to enable an administrator to manage and control the access to the parameter module 46 and the ride settings module 43. The authorization module 48 is configured to authorize a player, based upon player data or player profile data, to play a game experience through a computerized theme park ride. Non-limiting examples of an authorization module may be a security module as described in U.S. Pat. No. 7,295,832, issued to Hewel; or an authorization system as described in U.S. Pat. No. 8,082,582, issued to Li et al., which are incorporated for their supporting teachings herein.

Figure 5:
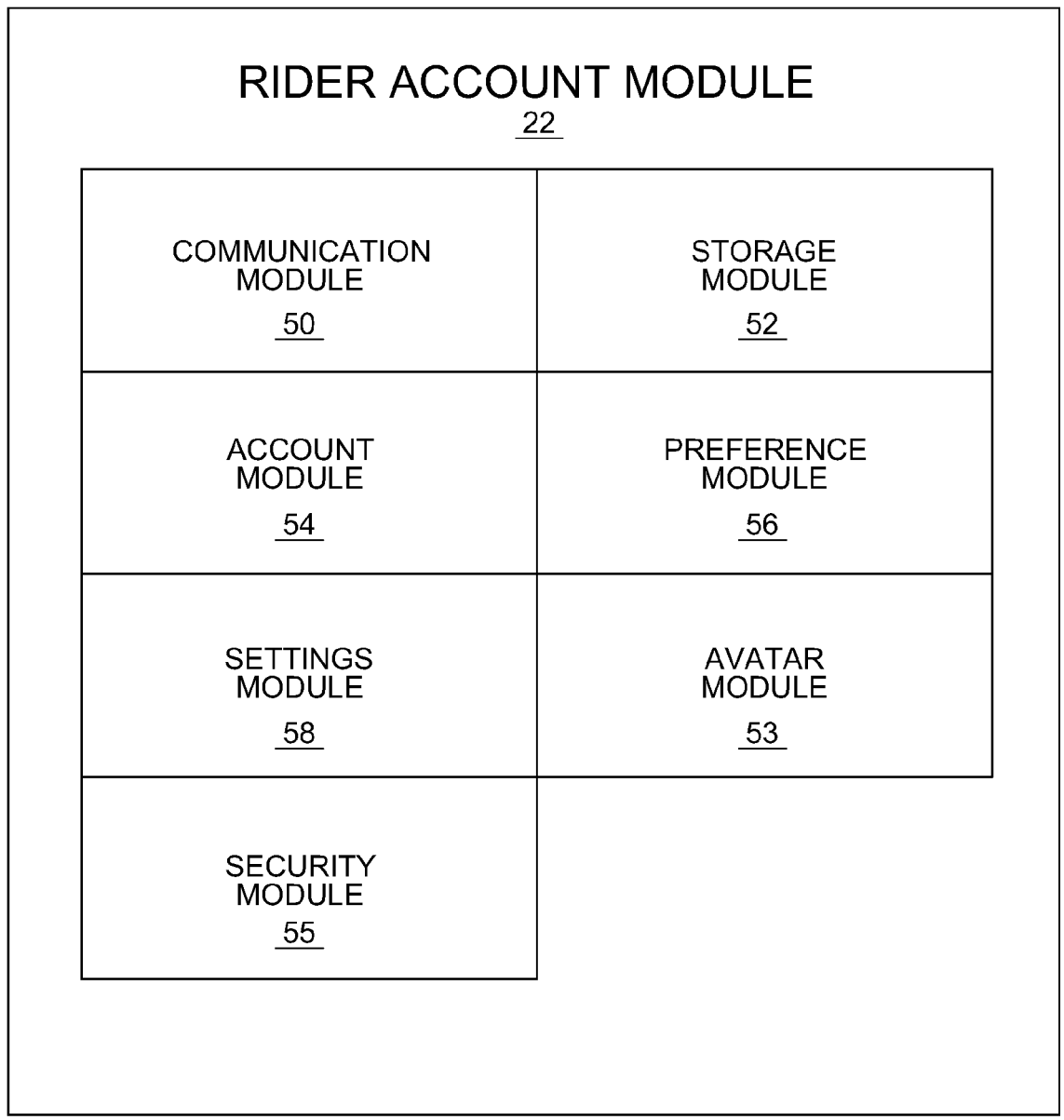
FIG. 5 is a module diagram of a rider account module of a system for providing a multi-player game experience, according to one embodiment of the invention.

FIG. 5 is a module diagram of a rider account module of a system for providing a multi-player game experience, according to one embodiment of the invention. There is shown a rider account module 22 including a communication module 50, a storage module 52, an account module 54, a preference module 56, a settings module 58, an avatar module 53, and a security module 55.

The illustrated rider account module 22 is configured to manage rider or player data and player profile data. The rider account module 22 is configured to store player data, player parameter preferences, player setting preferences for various game experiences through various computerized theme park rides. The rider account module 22 is in communication with a ride control module of a computerized theme park ride designed to provide a game experience therethrough. The rider account module 22 is configured to transfer, verify, and confirm settings, parameters, limitations, etc. for a game experience that a player is about to play through a computerized theme park ride.

The illustrated rider account module 22 includes a communication module 50 configured to provide communication capabilities to the modules and components of the rider account module. The rider account module 22 may be accessible through a smartphone, kiosk, or terminal throughout a theme park or amusement park. Such communication may be wireless, especially in regards to communications within a theme or amusement park or during a game experience through a computerized theme park ride. The communication module 50 may also be configured to provide a secure method of communication with a ride control module of a computerized theme park ride and a plurality of players playing a game experience over a network.

The illustrated rider account module 22 includes a storage module 52 is in communication with the communication module 50 and is configured to store rider account data regarding the preferences, settings, and limitations of a rider or player of a game experience through a computerized theme park ride. The storage module 52 is configured to store interactions and relationships with other players of the game experience.

The illustrated rider account module 22 includes a preference module 56 configured to store and set preferences and settings for the rider or player of a game experience through a computerized theme park ride. The preference module 56 is configured to track and store preferences of the rider or player during interactions, relationships, or use throughout a network or system of a theme park or amusement park. The preference module 56 may be configured to track, control, evaluate, store data about, alter, provide access to, update, and/or otherwise be involved in data regarding rider or player profile data used in a game experience through a computerized theme park ride.

The illustrated rider account module 22 includes an avatar module 53 configured to provide various control settings and preferences for individual avatars for a rider or player of a game experience through a computerized theme park ride. The avatar module 53 is configured to create, manage, alter an avatar configured to navigate through game experiences and computerized theme park rides. Each avatar may be created, designed, and specified by the rider or player to play certain game experiences or certain computerized theme park rides having particular preferences or settings associated with each of the avatars. Non-limiting examples of an avatar module may be a system as described in U.S. Patent Publication No.: 2008/0120558, by Nathan et al.; or a system as described in U.S. Patent Publication No.: 2009/0259648, by Bokor et al., which are incorporated for their supporting teachings herein.

The illustrated rider account module 22 includes an account module 54 in communication with the preference module 56 and the avatar module 53. The account module 54 is configured to manage and store rider or player account data to be used to preset parameters, settings, and preferences of a game experience before playing the game experience through a computerized theme park game. The account module 54 is configured to store personal data, such as purchasing information associated with the rider or player, to purchase items, tickets, etc. while navigating through a theme park or amusement park. Non-limiting examples of an account module may be an account management module as described in U.S. Patent Publication No.: 2003/0014509, by Jurado; or an account module as described in U.S. Pat. No. 7,364,071, issued to Esplin et al., which are incorporated for their supporting teachings herein.

The illustrated rider account module 22 includes a settings module 58 in communication with the account module 54 and the avatar module 53. The settings module 58 is configured to manage and store settings for the rider or player and for each avatar associated with the rider or player of a game experience through a computerized theme park ride. The settings module 58 is configured to set limitations and parameters for each avatar based upon player account data or player profile data.

The illustrated rider account module 22 includes a security module 55 in communication with the account module 54 and configured to provide security features and functions to the rider account module. The security module 55 is configured to provide secure accessibility to the modules and components of the rider account module while navigating or playing a game experience through a computerized theme park ride or while navigating through a theme park or amusement park. The security module 55 may include pass codes, passwords, etc. to access the modules and components of the rider account module or to alter or manage rider/player profile or account data. Non-limiting examples of a security module may be a security module as described in U.S. Pat. No. 6,957,342, issued to Vatanen; or a security module as described in U.S. Patent Publication No.: 2003/0028790, by Bleumer et al., which are incorporated for their supporting teachings herein.

Figure 6:
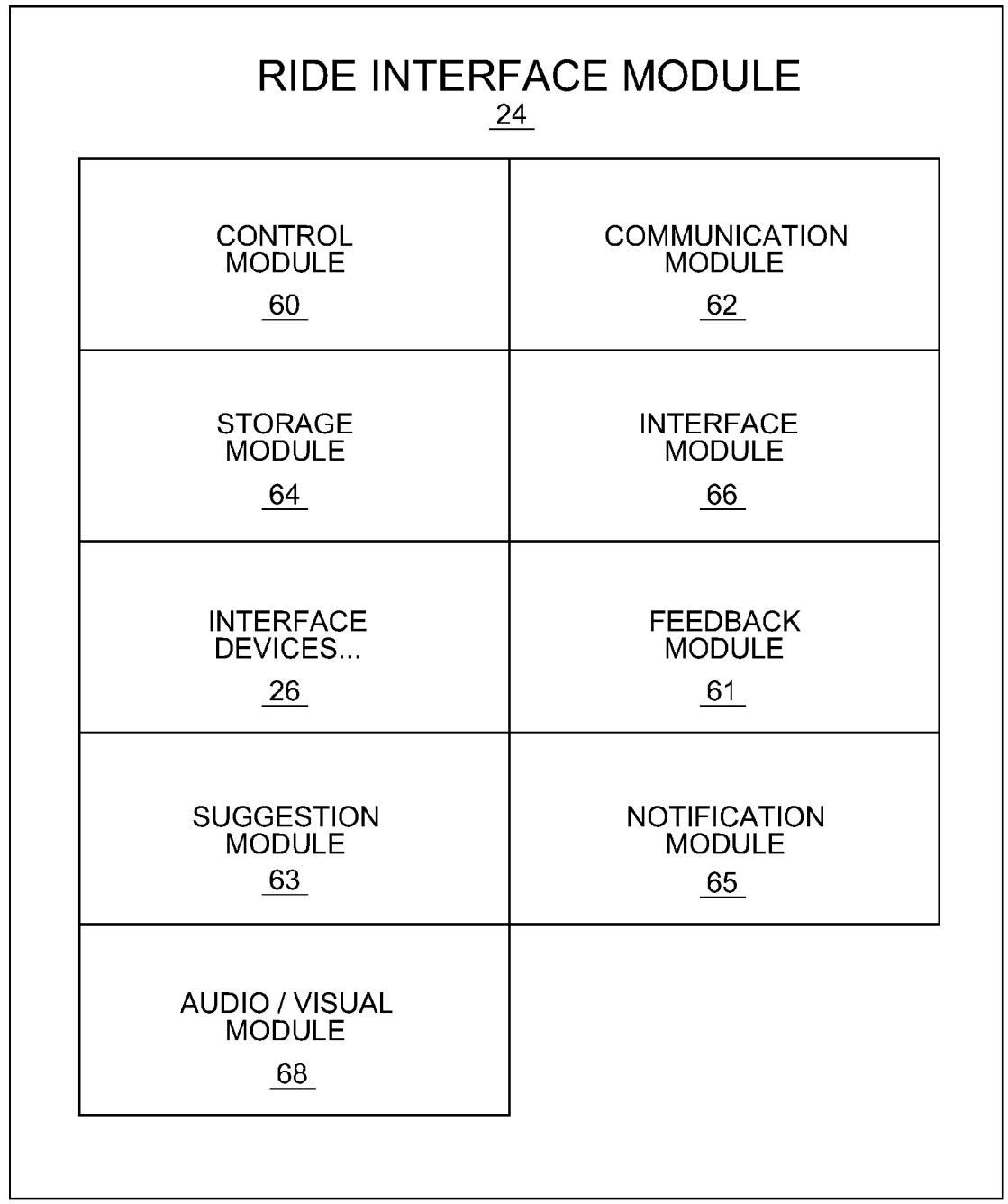
FIG. 6 is a module diagram of a ride interface module of a system for providing a multi-player game experience, according to one embodiment of the invention.

FIG. 6 is a module diagram of a ride interface module of a system for providing a multi-player game experience, according to one embodiment of the invention. There is shown a ride interface 24 module including a control module 60, a communication module 62, a storage module 64, an interface module 66, a plurality of interface devices 26, a feedback module 61, a suggestion module 63, a notification module 65, and an audio/visual module 68.

The illustrated ride interface module 24 is configured to provide an interface to operate and navigate the computerized theme park ride. The ride interface module 24 is in communication with a ride control module and a ride engine module configured to interact therewith over a network to provide a game experience through a computerized theme park ride. The ride interface module 24 includes an interface device configured to provide operational controls to a rider or player playing a game experience through a computerized theme park ride of a theme park or amusement park.

The illustrated ride interface module 24 includes a control module 60 configured to provide operational controls and instructions to the modules and components of the ride interface module. The control module 60 is in communication with the modules and components of the computerized theme park ride and is configured to provide operational instructions and commands thereto.

The illustrated ride interface module 24 includes a communication module 62 in communication with the control module 60 and configured to provide communication capabilities to the modules and components of the ride interface module. Such communication may be wireless, especially in regards to communications within a theme or amusement park or during a game experience through a computerized theme park ride. The communication module 62 may also be configured to provide a secure method of communication with a computerized theme park ride and a plurality of players over a network. The communication module 62 is configured to provide chat functions including group chats or message boards associated with a game experience, wherein riders or players may interact with one another.

The illustrated ride interface module 24 includes a storage module 64 in communication with the various modules and components of the ride interface module 24. The storage module 64 is configured to store data transferred through the ride interface module 24 and the modules and components thereof. The storage module 64 is configured to securely store ride interface data along with interface preferences and settings for a particular game experience or computerized theme park ride. The storage module 64 is configured to store data from the ride interface module, including data from the riders and players playing a game experience.

The illustrated ride interface module 24 includes an interface module 66 in communication with the modules and components of the ride interface module 24 and configured to provide navigational and interface capabilities to a user or player thereof. The interface module 66 may include a touch-screen or gaming controls to operate and navigate a game experience through a computerized theme park ride. Non-limiting examples of an interface module may be a game apparatus as described in U.S. Patent Publication No.: 2007/0265076, by Lin et al.; or a display/interface module as described in U.S. Pat. No. 6,272,562, issued to Scott et al.; or a touch screen interface module as described in U.S. Pat. No. 5,884,202 and U.S. Pat. No. 6,094,609, issued to Arjomand, which are incorporated for their supporting teachings herein.

The illustrated ride interface module 24 includes an audio/visual module 68 in communication with the control module 60 and the interface module 66. The audio/visual module 68 is configured to provide audio sounds and visual displays to a player while playing a game experience through a computerized theme park ride. The audio/visual module 68 includes a plurality of speakers configured to produce sound to a player playing a game experience. The audio/visual module 68 includes a display device or a plurality of display devices configured to provide visual display to a player of a game experience through a computerized theme park ride. Non-limiting examples of an audio/visual module may be an audio-visual entertainment module as described in U.S. Pat. No. 4,695,903, issued to Serap et al.; or an audio-visual system as described in U.S. Pat. No. 7,391,439, issued to Buchner et al., which are incorporated for their supporting teachings herein.

The illustrated ride interface module 24 includes a feedback module 61 in communication with the control module 60 and configured to provide feedback capabilities regarding the game experience to a rider or player playing a computerized theme park ride. The feedback module 61 is configured to provide comments or suggestions regarding preferences of the player of the game experience. The feedback module 61 is configured to provide feedback to the ride control module regarding the parameters and settings used by the player during the computerized theme park ride. The feedback module 61 is configured to store previously used settings for each game experience and each computerized theme park ride. Non-limiting examples of a feedback module may be a feedback module as described in U.S. Patent Publication No.: 2005/0165745, by Hagame et al.; or a user feedback engine described in U.S. Patent Publication No.: 2011/0193699, by Van Acht et al., which are incorporated for their supporting teachings herein.

The illustrated ride interface module 24 includes a suggestion module 63 in communication with the control module 60 and the feedback module 61. The suggestion module 63 is configured to provide suggestions of parameter settings and configurations for various game experiences and various computerized theme park rides. The suggestion module 63 is configured to suggest previously used or most commonly used settings and parameters for a particular game experience or computerized theme park ride. The suggestion module 63 is configured to suggest parameters and settings based upon feedback from the feedback module. Non-limiting examples of a suggestion module may be a system as described in U.S. Patent Publication No.: 2012/0045102, by Lung; or a system as described in U.S. Pat. No. 8,090,353, issued to Aaron et al., which are incorporated for their supporting teachings herein.

The illustrated ride interface module 24 includes a notification module 65 in communication with the control module 60 and the interface module 66. The notification module 65 is configured to provide notifications to a user or player while playing a game experience through a computerized theme park ride or while navigating through a theme park or amusement park over a network. The notification module 65 is configured to prompt a rider or player to select game operation and game media parameters for a game experience through a computerized theme park ride. The notification module 65 is configured to notify a user or player when approaching a game experience of a computerized theme park ride. The notification module 65 is configured to notify a user or player when the user or player is within a pre-defined proximity to a game experience. The notification module 65 is also configured to notify users or players of other users or players interactions, and activities relating to a game experience or a computerized theme park ride. Non-limiting examples of a notification module may be a notification module as described in U.S. Pat. No. 8,140,015, issued to Ohkita; or a system as described in U.S. Pat. No. 7,308,275, issued to Cole et al., which are incorporated for their supporting teachings herein.

The illustrated ride interface module 24 includes a plurality of interface devices 26 in communication with the communication module 62 and the control module 60. The plurality of interface devices 26 may be a Smart phone, a kiosk, or a terminal configured to access the ride interface module over a network. The plurality of interface devices 26 includes a program configured to be uploaded and operated through a Smart phone, kiosk, or terminal in communication with a ride control module of a game experience through a computerized theme park ride.

FIG. 7 is a module diagram of a ride engine module of a system for providing a multi-player game experience, according to one embodiment of the invention. There is shown a ride engine module 28 including a control module 70, a processor module 72, a communication module 74, a storage module 76, a game experience module 78, a game media module 73, and a game operation module 75.

The illustrated ride engine module 28 is configured to operate a multi-player game experience according to pre-defined game parameters including game operation and game media parameters and to present a game experience for each of the plurality of players wherein the game operation parameters are identical for each player and the game media parameters are consistent with the received game media parameter selections for each player, respectively, thereby providing a coordinated yet disparate game experience for the plurality of players.

The illustrated ride engine module 28 includes a control module 70 configured to provide operational controls and instructions to the modules and components of the computerized theme park ride. The control module 70 is in communication with the modules and components of the computerized theme park ride and is configured to provide operational instructions and commands thereto. The control module 70 is configured to control and manage the features and functions of the computerized theme park ride and the interactions with the plurality of players playing the game experience through the computerized theme park ride.

The illustrated ride engine module 28 includes a processor module 72 in communication with the control module and configured to provide computerized processing to the modules and components of the ride engine module. The processor module 72 is configured to compute data received from a plurality of players of a game experience through a computerized theme park ride. The processor module 72 is configured to compute settings and parameters for each player of the game experience through the computerized theme park ride. The processor module 72 is also configured to computer game operation and game media parameters for each of the plurality of players of the game experience through the computerized theme park ride. Non-limiting examples of a processor module may be a processor module as described in U.S. Pat. No. 6,516,373, issued to Talbot et al.; or a processor module as described in U.S. Patent Publication No.: 2006/0155955, by Gschwind et al., which are incorporated for their supporting teachings herein.

The illustrated ride engine module 28 includes a communication module 74 in communication with the control module 70 and configured to provide communication capabilities to the modules and components of the computerized theme park ride. Such communication may be wireless, especially in regards to communications within a theme or amusement park or during a game experience between the ride engine module, the ride control module, the ride interface module, and the plurality of players. The communication module 74 is also be configured to provide a secure method of communication with a computerized theme park ride and a plurality of players over a network.

The illustrated ride engine module 28 includes a storage module 76 in communication with the various modules and components of the ride engine module 28. The storage module 76 is configured to store data transferred through the ride engine module and the modules and components thereof. The storage module 76 is configured to securely store ride engine control data along with configuration, parameter, and settings data for the plurality of players of the game experience. The storage module 76 is configured to store data from the ride engine module, including data from the players playing a game experience, data from players waiting to play a game experience, data from players after playing a game experience through a computerized theme park ride, etc.

The illustrated ride engine module 28 includes a game experience module 78 in communication with the control module 70 and configured to provide and operate a multi-player game experience through a computerized theme park ride. The game experience module 78 is configured to operate a game experience based upon predefined game parameters through a computerized theme park ride. The game experience module 78 is configured to include audio components, visual components, interactive activities, interactive challenges, etc. to play a game experience through a computerized theme park ride. Non-limiting examples of a game experience module may be a game engine module as described in U.S. Patent Publication No.: 2012/0052953, by Annambhotla et al.; or a system as described in U.S. Pat. No. 8,108,423, issued to Treat et al.; or a system as described in U.S. Pat. No. 8,079,916, issued to Henry, which are incorporated for their supporting teachings herein.

The illustrated ride engine module 28 includes a game operation module 75 in communication with the control module 70 and the game experience module 78. The game operation module 75 is configured to control and manage the game operation parameters for a game experience through a computerized theme park ride during the actual play of the game. The game operation module 75 is configured operate according to the set parameters for game experience play for a plurality of players of a computerized theme park ride. The game operation parameters may include, but not limited to: object creation/destruction triggers, event creation/termination triggers, player stat increment/decrement triggers, player location/movement rules, non-player location/movement rules, victory/loss conditions, field of view rules, game start conditions, and award conditions. Non-limiting examples of a game operation module may be a system as described in U.S. Patent Publication No.: 2009/0054147, by Chiu et al.; or a game system as described in U.S. Patent Publication No.: 2008/0096662, by Kuwahara et al.; or a game control program described in U.S. Pat. No. 8,162,747, issued to Hayasaka, which are incorporated for their supporting teachings herein.

The illustrated ride engine module 28 includes a game media module 73 in communication with the control module 70 and the game experience module 78. The game media module 73 is configured to control and manage the game media parameters for a game experience through a computerized theme park ride. The game media module 73 is configured to set parameters for game experience play for each of the plurality of players, individually, of a computerized theme park ride. The game media parameters may be, but not limited to: interface skin, game genre, maturity rating, presence of gore, background graphics, background sound, effects graphics, effects sounds, non-player character graphics, non-player character sounds, equipment skins, game board skins, game environment sounds, and game environment graphics. Non-limiting examples of a game media module may be a system as described in U.S. Patent Publication No.: 2012/0021835, by Keller et al.; or an apparatus as described in U.S. Pat. No. 7,761,283, issued to Curtis et al.; or a device as described in U.S. Pat. No. 8,195,809, issued to Langan et al., which are incorporated for their supporting teachings herein.

Figure 8:
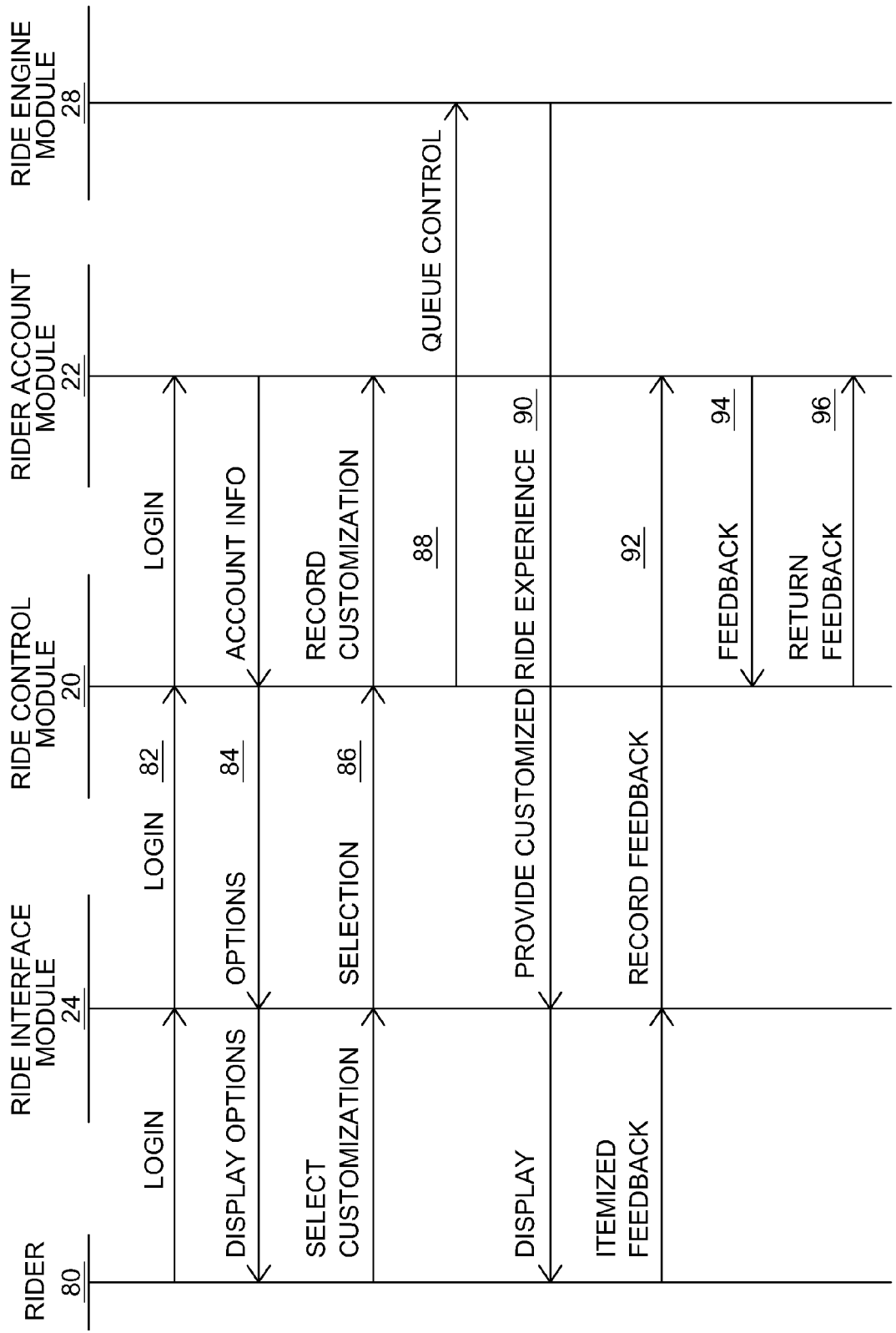
FIG. 8 is a sequence of a method for providing a multi-player game experience, according to one embodiment of the invention.

FIG. 8 is a sequence diagram illustrating a method for providing a multi-player game experience, according to one embodiment of the invention. There is shown a rider 80 in communication with a ride interface module 24, a ride control module 20, a ride engine module 28, and a rider account module 22 each in sufficient communication to permit the illustrated communications/interactions between the modules to occur.

In particular, the illustrated method begins with a player/rider login into a system through the ride interface module 82, which communicates with the ride control module and the rider account module in order to effectuate login of the player and select valid options for game media parameters to the player and display the same to the player through the ride interface module 84. The player makes the associated selections as desired and those selections along with any automatic selections are then communicated to the ride control module and the rider account module, wherein the rider account module makes a record in anticipation of the ride experience 86. The ride engine module is initialized according to the selection data and queues the experience for the player/rider 88. The ride engine module provides a customized ride experience to the rider through a ride interface module that may be the same as the ride interface module already accessed by the player or may be another 90. After the ride experience, the rider is able to provide itemized feedback about the experience which may be recorded with the rider account module and may be associated with the record previously created by the rider account module 92. Such feedback may be distributed throughout parts of the system, including the rider control module. Feedback may include feedback about the experience, the game media parameters, the game itself, the other players, etc. and may be automatically associated with one or more modules or accounts accordingly. Feedback from other players may processed and/or analyzed by the system and may be given in part, whole or in processed form back to the player by distributing the information to the rider account module wherein it may be associated with the player, the record of the game experience, or another appropriate association may be made/recorded based on the content of the information 94. The ride control module is also configured to return feedback back to the rifer account module 96.

According to one embodiment of the invention, there is a method for providing a multi-player game experience through a computerized theme-park ride. The method may include the step providing a computerized theme park ride that may include a ride engine module that may be configured to operate a multi-player game experience according to predefined game parameters that may have game operation and game media parameters. The method may include the step of managing game media parameters of the multi-player game experience through a ride control module in communication with the ride engine module. The method includes receiving game media parameter selections from a plurality of players through a ride interface module that may include an interface device in communication with the ride control module.

The method may include the step of performing a multi-player game session through the computerized theme-park ride, with the plurality of players wherein the ride engine module, may be using a processor, may present a game experience for each of the plurality of players wherein the game operation parameters may be identical for each player and the game media parameters may be consistent with the received game media parameter selections for each player, respectively, thereby providing a coordinated yet disparate game experience for the plurality of players. The method may also include the step of receiving player information associated with a particular player from an account module. The method may include the step of automatically selecting a game media parameter based on the received player information. The method may include the step of automatically suggesting a game media parameter based on received player information. The method may further include the step of prompting a player for game media parameter selections when an interface device associated with the player approaches within a predefined physical proximity to the computerized theme park ride.

Prophetic Contextual Method and/or System

The following is a non-limiting exemplary description of a system and/or method within which and/or with which the previously described method and system may operate and/or interoperate with in various embodiments of the invention. In some cases there is overlap in function, name and/or description of the various modules described herein. The previously described modules may be in communication with modules described hereafter in manners that permit the flow of information and/or instructions as needed to coordinate between the modules as may be needed to carry out one or more of the functions, features, benefits, operations, options and/or etc. described herein and/or to solve one or more of the problems described herein.

There may be a server module in communication with a plurality of remote interface modules and a plurality of park interface modules.

The server module may be configured to be in communication with a plurality of remote interface modules and a plurality of park interface modules. The server module may be configured to coordinate and organize communication between the park interface modules and the remote interface modules. The server module is in communication with the plurality of park interface modules and the remote interface modules over a network. The interface modules may be a HTML player, client server application, Java script application. A non-limiting example of an interface module is Flow-Player 3.1, manufactured by FlowPlayer LTD, Hannuntie 8 D, ESPOO 02360, Helsinki, Finland.

The remote interface modules includes a plurality of websites in communication with the server module and configured to provide interactive controls through a web portal or network using a computing device, such as a desktop computer, laptop computer, or any other computing device configured to be in communication with the server module over a network. The plurality of remote interface modules includes a plurality of mobile applications in communication with the server module and configured to provide interactive controls through a network using a personal digital assistant or a smart phone. The personal digital assistant or the smart phone may be configured to download an application that is in communication with the server module and configured to provide interaction therethrough.

The remote interface modules includes a plurality of computer/console games in communication with the server module and configured to provide interactive controls through a display screen, such as a television screen or display device. Non-limiting examples of server modules include: a HP MediaSmart Server EX495, manufactured by Hewlett-Packard Company, 3000 Hanover Street, Palo Alto, Calif., 94304, USA; a Intel Server System SR2500ALBKPR, manufactured by Intel Corporation, 2200 Mission College Blvd, Santa Clara, Calif., 95054, USA. The server module includes a control module. Non-limiting examples of a control module may be a control module described in U.S. Pat. No. 5,430,836, issued to Wolf et al.; or a control module described in U.S. Pat. No. 6,243,635, issued to Swan et al. which are incorporated for their supported teachings herein. A control module may include but is not limited to a processor, a state machine, a script, a decision tree, and the like.

The control module includes a processor module. The following are non-limiting examples of processor modules: a HP MediaSmart Server EX495, manufactured by Hewlett-Packard Company, 3000 Hanover Street, Palo Alto, Calif., 94304, USA; a Intel Server System SR2500ALBKPR, manufactured by Intel Corporation, 2200 Mission College Blvd, Santa Clara, Calif., 95054; a processor module as described in U.S. Pat. No. 4,443,865, issued to Schultz et al. is incorporated for its supported teachings herein; a blade server module as described in U.S. Pat. No. 6,665,179, issued to Chou is incorporated for its supported teachings herein. In a non-limiting example, a processor module includes hardware and/or software including instructions for coordinating the display of image information from a plurality of image sets through a display/projection system having the capacity to display according to a plurality of characteristics. The processor module may couple instructional metadata to image set data such that the display/projection module may receive and display the image data according to the accompanying instructions. Image processing may occur (in the processor module, display/projection module, other module, and/or combinations thereof), such as but not limited to color shifting, time shifting, cloning, scrambling, encrypting, polarizing, frequency mapping, and the like.

The park interface modules include a plurality of games, rides and/or attractions in communication with the server module and configured to provide entertainment to the users of the remote interface modules. The rides and attractions may include robotics, unmanned vehicles, smart vehicles, roller coasters, video games, live action games, puzzles, bumper cars, and the like and combinations thereof and may include computerized controls, interfaces, media displays, processors, motors, sensors, data storage devices, projectors, weapons, hand-held devices, and the like and combinations thereof. The park interface modules include a plurality of kiosks in communication with the server module and configured to provide network access to the plurality of remote interface modules as the user navigates a theme/amusement park. The park interface modules include a plurality of camera modules in communication with the server module and configured to provide digital images of the park and the users interacting with the park. The park interface modules include a plurality of shops/stores in communication with the server module and configured to provide merchandise/goods to the user through the server module.

In one non-limiting embodiment, there is a theme park or attraction having a plurality of rides/events that may be controlled/influenced by computer controlled devices/modules linked to one or more servers/server modules, which may also be linked to one or more remote devices/modules that may be accessible by the users (attendees, customers, administrators, vendors, contractors, and/or employees) of the park/attraction. Such users may have accounts that may be stored in one or more of the modules listed herein and such accounts may interact with one or more of the modules listed herein in a manner that changes the account and/or changes operation of a module described herein.

There may be a user account module of a system of collaborating entertainment having a personal characteristic module, a game attributes module, a specific game attributes module, a social network module, and a historical data module. A user account may include one or more of a data structure of a database, a table, a initialization script, an html cookie, an encrypted key, a username, a password, a computer readable device, and a token.

The personal characteristic module may be configured to store real world characteristics or data of the user. The personal characteristic module may be configured to provide and store personal data of the user. Personal characteristics may include, but not limited to: name, age, email address, billing information, physical address, passwords, preferred language, and etc. The personal characteristic module may be configured to secure user characteristics and data. The personal characteristic module includes a storage module. Non-limiting examples of a storage module may include: a HP Storage Works P2000 G3 Modular Smart Array System, manufactured by Hewlett-Packard Company, 3000 Hanover Street, Palo Alto, Calif., 94304, USA; a Sony Pocket Bit USB Flash Drive, manufactured by Sony Corporation of America, 550 Madison Avenue, New York, N.Y., 10022.

The game attributes module may be configured to store and track game stats of the user while playing games/rides or interacting/navigating the theme/amusement park. The game attributes module may be configured to store and manage the user's avatar or character displayed within the theme/amusement park and during the games/rides. The game attributes module may include, but not limited to storing and tracking a user's avatar's physical characteristics, height, weight, nationality, clothing, facial features, race, reputation, score, character class, physical characteristics, emotional characteristics, mental characteristics, spiritual characteristics, magical characteristics, knowledge, talents, quirks, flaws, handicaps, inventory, virtual cash, trophies, achievements, permissions, privileges, restrictions, and etc. thereby creating an avatar of the user to navigate the theme/amusement park and play games/rides therewith. The game attributes module may include an avatar creation module. A non-limiting example of an avatar creation module is described in U.S. Patent Publication No.: 2009/0259648, by Bokor et al., which is incorporated for its supported teachings herein.

The specific game attributes module may be configured to store, track, and manage data associated with various and/or specific games/rides to be played and/or already played by the user or a plurality of users within the theme/amusement park. The specific game attributes module may store, track, and manage, but not limited to, a user's experience points, health points, skill points, weaponry, kills, inventory, kill percentage, shot percentage, achievements, permissions, trophies, etc. for each individual game or ride played. The specific game attributes module may be configured to store game attributes for each user every time the user plays a game/ride or navigates through the theme/amusement park. The user may win or earn game/ride points and may be stored within the specific game attributes module. The game/ride points may be used to purchase new equipment, weapons, armor, ammo, health, shields, accessories, inventory items, trophies, permissions, real-world goods/services, tickets, avatar enhancements, and the like and etc. from a shop/store of the theme/amusement park. The game/ride points may be traded or sold between the user and other user's accounts, or between the user and the theme/amusement park shops and stores. A non-limiting example of a specific game attributes module may be a game as described in U.S. Patent Publication No.: 2011/0053693, by Wright, which is incorporated for its supported teachings herein.

The social network module may be configured to mimic, generate, reproduce and/or be in communication with a social network, such as, but not limited to those known as: Facebook, Twitter, Google+, etc. The social network module may be configured to link a user's game/ride attributes or game/ride accomplishments to a social network and/or to other users/visitors. The user may post accomplishments, request help, request advice, reply to questions, generate events, invite others, push information, pull information, and etc. that may be regarding specific players, visitors, employees, third-parties, games or rides at the theme/amusement park. The social network module includes a chat module in communication with a network and configured to provide chat/communicating capabilities over a network to communicate with other users or a group of users. The social network module may be configured to connect the user to friends, family, clubs, guilds, groups, organizations, etc. A non-limiting example of a social network module may be a social network module described in U.S. Patent Publication No.: 2010/0216553, by Chudley et al., which is incorporated for its supported teachings herein.

The historical data module may be configured to store and track user game/ride data. The historical data module may be configured to store and track user scores, user profiles, user records, user match-ups, etc. for each game and ride of the theme/amusement park the user plays or interacts with. The historical data module is in communication with the social network module and configured to broadcast or display achievements, accomplishments, records, high scores, etc. over the social network or with a group or club network.

A user account may be associated with one or more networks, such as but not limited to social networks (Facebook, LinkedIn, Twitter, etc.), CRM and/or business management software, Project management software, and the like and combinations thereof. Such association may include passing data back and/or forth between the user account and the other network/software and/or altering such in response to the other. A user account may pull or receive information therefrom and/or may push or provide information thereto. As a non-limiting example, a user account may publish a game victory on an associated Twitter account. As a non-limiting example, a user account may collect a friend or follower list from an associated network and may use such to establish or suggest game network associations. As a non-limiting example, a user account may send game accomplishments to a project management tool or in-game connections to a CRM tool where such may be recorded and associate with campaigns or tasks. A social network module may include username, password, and other login information for particular networks. Such may be encrypted or otherwise wrapped in security.

A social network module may include data generating an internal social network that may include or mimic one or more features of existing social networks, such as but not limited to Facebook, LinkedIn, Twitter and the like. Users may create associations manually, bilaterally, unilaterally, through shared interactions (game victories, losses, etc.), through automated filtering of one or more user or avatar characteristics (all employees may be connected, all top scorers may be connected, etc.), or other methods of determining, selecting, choosing, automating, establishing, or building social network connections. A social network module may associated a user account with a virtual entity account that may not be tied to a particular user, but may, as a non-limiting example, exist as an in-game avatar, narrator, associated business or game sponsor, guild, company, or other similar account or combinations thereof. As a non-limiting example, where a user plays a particular game wherein a virtual entity is rescued, the user may be offered a "friend request" by the virtual entity and may choose to accept such.

In one non-limiting embodiment, a specific game attribute may be associated with a particular game. Data associated with the same may be provided to a different game or other module and may be used in association with providing a determined result, such as but not limited to unlocking an event, option, game, reward, inventory item, power, capability, authority, and the like and combinations thereof, even though the different game may not be directly associated with the game associated with the specific game attribute in any other way.

In one non-limiting embodiment, a user account of an employee may be in communication with one or more employee records, tracking systems, management systems and the like or combinations thereof. Feedback from players may be received, stored, processed, calculated, or otherwise interacted with through an employee's user account and data may be passed to or from such other systems. In one non-limiting embodiment, employee pay, benefits, promotions, and the like may be influenced and/or decided based on feedback by park visitors. Employees may be automatically identified to park visitors through a badge with identification (number, name, etc.), carried RFID tags, association with a particular ride experience that is saved on a user account, or the like or combinations thereof. Employee user account characteristics may influence game/ride/event features/capabilities/configurations and the like. As a non-limiting example, a particular ride may have a greater likelihood of dispensing better random virtual loot to players on victory when the game is managed/operated/hosted by an Employee designated as Employee of the Month.

There may be a ride control module of a system of collaborating entertainment. The ride control module includes a configuration suggestion module, a rating module, an experience coordination module, a data collection module, a user account coordination module, a player feedback module, an input module, and a display module.

The configuration suggestion module may be configured to suggest game or ride configurations for the user or a plurality of user's for a game or a ride gameplay. The configuration suggestion module may include, but not limited to suggestions for scenery, background, terrain, weaponry, opponents, skill level, equipment, landscape, mission, objectives, etc. The configuration suggestion module may be configured to store previous user settings for specific games or rides and set the default settings to the most commonly used configurations by the user. The configuration suggestion module may also suggest modes or controller configurations for beginner, intermediate and advanced users. The configuration suggestion module may access information from user accounts and may base suggestions on such information.

The rating module may be configured to provide a rating for a game or ride of the theme/amusement park. The rating module may be configured to provide an audience rating or a user rating, depending on the amount of violence, language, and interaction within a game or ride. The rating module may be configured to block user's that are not allowed to view graphic violence or foul language, such as children, from participating in the game or ride. The rating module may be configured to display graphic violence and language to an adult user playing a game/ride, and display non-graphic violence and non-foul language to a child user playing the same game/ride as the adult user. The rating module may be configured to automatically set the violence and language level according to pre-determined settings or set by the user or the user's parent or by another source that may be automated. The rating module may also show/determine other game characteristics related to the experience such as but not limited to speed of play, difficulty of play (novice, casual, hardcore, etc.), availability of options, accessible experiences, language and the like and combinations thereof. A rating module may utilize a rating schedule, grid, chart, system or the like that provides a pattern to ratings and/or options selectable such that a user may be able to understand and/or select ratings that are appropriate to them and/or the system may be able to offer particular rating ranges that are appropriate to the user account. A non-limiting example of a rating module may be a content rating module as described in U.S. Patent Publication No.: 2010/0058377, by Grob et al., which is incorporated for its supported teachings herein.

The experience coordination module may be configured to match the gameplay among visitors. Such may be accomplished by passing game data between game engines (real time parallel data transfer or serial data transfer games, by using a single game engine for multiple players such as in multiplayer first person shooters using the Unreal Game Engine developed by Epic Games of Cary, N.C., and/or etc.). Data may be stored in configuration files, scripts, media files, save files and the like and combinations thereof. Data passed may include positions and status of virtual objects (MOBs, enemies, loot, containers, obstructions, landscape, etc.), scores, game statuses, character attributes/characteristics, trophies/achievements, and the like and combinations thereof.

The experience coordination module may also be configured to match a user's skill level or experience level with other users having similar skill levels or experience levels for gameplay during a game or a ride of the theme/amusement park. The experience coordination module may be configured to manage and organize games and rides to have equal opponents or equal teams regarding skill level and experience level of each user or each team. The experience coordination module may be configured to split the advanced users or players into equal teams, the intermediate users and players into equal teams, and the beginning users or players into equal teams. It may generate a handicap for a particular player. The experience coordination module includes an image/video processing module. The following are nonlimiting examples of image/video processing modules: a 3D graphics accelerator described in U.S. Pat. No. 6,016,151, issued to Lin is incorporated for its supported teachings herein; a 3D computer graphics system as described in U.S. Pat. No. 6,747,642, issued to Uasumoto, is incorporated for its supported teachings herein; a 3D processing unit as described in U.S. Pat. No. 6,424,348, issued to Parikh et al., is incorporated for its supported teachings herein; a 3D graphics model as described in U.S. Pat. No. 6,714,201, issued to Grinstein et al. is incorporated for its supported teachings herein.

The ride control module includes a data collection module. The data collection module may be configured to store and track data associated with each game or ride and each user or team. The data collection module may be configured to update user status, user data, game data, game stats, historical data, specific game data, scores, records, achievements, accomplishments, etc. with the user's profile or user's game attributes and stats.

The user account coordination module is in communication with the data collection module and may be configured to update user account data with newly collected data from the games, rides, or interaction throughout the theme/amusement park. The user account coordination module may be configured to store and track user data relating to specific games or rides, game/ride attributes, preferences, settings, configurations, reputation, etc. of each game or ride or interaction throughout the theme/amusement park.

The player feedback module may be configured to provide communicating capabilities to the users of the games/rides and throughout the theme/amusement park. The player feedback module may be configured to provide users with the ability to provide feedback to other users before, during, or after game play or a ride. The player feedback module may include a chat room, a message board, a discussion board, private messages, public posts, personal messages, etc. configured to allow users to post questions, answers, scores, records, or conversations with other users. The player feedback module may include a player rating module configured to allow users to rate other players or users participating in a previous game or ride. The users may be able to rate other players on skill level, experience level, level expertise, ability, status, etc. The player feedback module includes a communication module. Non-limiting examples of a communication module may be but not limited to: a communication module described in U.S. Pat. No. 5,307,463, issued to Hyatt et al.; or a communication module described in U.S. Pat. No. 6,133,886, issued to Fariello et al. which are incorporated for their supported herein.

The ride control module includes an input module configured to provide users with a means to input communication with other users, the game/ride, and with the theme/amusement park. The input module may include a keyboard or a simplified keyboard configured to input characters onto a display device or player feedback module. The input module may include a game/ride controller configured to control and navigate the user through the game/ride or the theme/amusement park. The input module may include a plurality of languages.

The display module may be configured to display a game interface to a player, such as but not limited to displaying a first person shooter interface, a vehicle simulation interface, a third person strategy game interface, and/or a user/avatar navigating the theme/amusement park. The display module is also configured to provide a viewing device configured to display data or game/ride play to the user. The display module may include a television, projector, LCD display, electronic paper display, a computer screen, 3D television, etc. and/or combinations thereof. The following are nonlimiting examples of display and/or projector screen modules: a 3D projection display as described in U.S. Pat. No. 5,703,717, issued to Ezra et al. is incorporated for its supported teachings; a display video apparatus as described in U.S. Pat. No. 5,132,839, issued to Travis is also incorporated for its supported teachings herein; a DLP XGA proj 3000 Lum 3000 3D Projector, manufactured by Texas Instruments Inc., 12500 TI Blvd., Dallas, Tex., 75243; a Samsung 3D Television, manufactured by Samsung Electronics America, 105 Challenger Road, Ridgefield Park, N.J., 07660.

In one non-limiting embodiment, there is a room including a plurality of computers having interfaces (video screens, headphones, keyboards, controllers, and the like) that are positioned in a manner suggestive of a particular style or theme of gameplay (positioned in a faux helicopter in places where pilots and gunners might be). The computers are networked together and/or in association with a server that controls or manages game play. Control may be distributed across multiple computing devices which may include one or more of the computers used by the players. Software may be loaded on one or more computers that facilitates game-play and that generates user interfaces and feedback associated with game-play.

Game-play may be interactive (multiplayer), cooperative, competitive, and the like and combinations thereof. Game-play may be massively or modularly interactive, such as but not limited to MMORPG games, such as but not limited to Everquest, World of Warcraft, and the like. Game-play may be based on simulations, such as but not limited to driving simulators, flight simulators, and the like and combinations thereof. Game-play may be of a "sandbox"-type wherein users are permitted to explore and interact with a "game world" such as but not limited to games such as Grand Theft Auto and the like. Modular multiplayer game play includes a plurality of games and/or game styles that are integrated in a whole, such as but not limited to a group of players playing a sandbox style flight simulation first person shooter who are integrated with a group of players playing a sandbox style tank simulation third person strategy game, who are integrated with a group of players playing a live action computer assisted infantry simulation.

Such integration may include shared opponents, victory conditions, failures, defeats, setbacks, resources, successes, rewards and the like among gamers playing the modularly integrated games. Integration may also include serial and/or parallel game play, especially wherein events, achievements, successes, and/or failures of one group may impact game play of another group. Such may be accomplished by passing game data between gameplay modules, using a shared software kernel among games, passing user account data between players, activating/triggering game devices in one game module based on information from another game module, and the like and combinations thereof.

There may be a remote interface module including an input module, a display module, an user account interaction module, a store module, a feedback module, a social network interaction module, a global positioning system module, and a data capture module.

The remote interface module includes an input module configured to provide users with a means to input communication with other users, the game/ride, and with the theme/amusement park. The input module may include a keyboard or a simplified keyboard configured to input characters onto a display device or player feedback module. The input module may include a game/ride controller configured to control and navigate the user through the game/ride or the theme/amusement park. The input module may include a plurality of languages. A non-limiting example of an input module may be an input module as described in U.S. Patent Publication No.: 2009/0002318, by Yang et al., which is incorporated for its supported teachings herein.

The display module may be configured to display the user/avatar navigating the theme/amusement park. The display module is also configured to provide a viewing device configured to display data or game/ride play to the user. The display module may be a television or a computer screen. Non-limiting examples of a display/interface module may be a display/interface module as described in U.S. Pat. No. 6,272,562, issued to Scott et al.; a touch screen interface module as described in U.S. Pat. No. 5,884,202 and U.S. Pat. No. 6,094,609, issued to Arjomand, which are incorporated for their supported teachings herein.

The user account interaction module is in communication with a user account coordination module of the ride control module. The user account interaction module may be configured to update and store user account data used by a server module of the system of collaborating entertainment. The user account interaction module may be configured to allow the user to access account data and modify account data relating to the user. The user account interaction module may be configured to store and modify a user's name, age, email address, billing information, physical address, passwords, gamer tag (nickname, avatar name, etc.), and potentially any other information associated with a user account (where the user has permission from the system), and etc.

The store module may be configured to provide user access to a store or shop affiliated with the theme/amusement park or with a specific game or ride. The store module may be configured to provide navigational means to browse the store's inventory for merchandise or collectables. The store module may be configured to provide purchasing means to the user, to purchase merchandise, products, services, memberships, tickets, etc. The store module includes an internet shopping cart. Non-limiting examples of internet shopping carts include Big Commerce, manufactured by Interspire Inc., 9606 N. MoPac Suite 960, Austin, Tex., 78759; Shopsite Pro manufactured by Shopsite Inc., 51 West Center, #511, Orem, Utah, 84057; X-Cart: PHP Shopping Cart software manufactured by Creative Development, Krasnoarmeyskaya 111, 432071, Ulyanovsk, Russia.

The feedback module may be configured to provide communicating capabilities to the users of the games/rides and throughout the theme/amusement park. The feedback module may be configured to provide users with the ability to provide feedback to other users before, during, or after game play or a ride. The feedback module may include a chat room, a message board, a discussion board, private messages, public posts, personal messages, etc. configured to allow users to post questions, answers, scores, records, or conversations with other users. The feedback module may include a player rating module configured to allow users to rate other players or users participating in a previous game or ride. The users may be able to rate other players on skill level, experience level, level expertise, ability, status, reputation, and etc.

The social network interaction module is in communication with a social network, such as, but not limited to: Facebook, Twitter, Google+, etc over a network. The social network interaction module may be configured to link a user to a social network. The user may post accomplishments, request help, request advice, reply to questions, etc. regarding specific games or rides at the theme/amusement park. The social network interaction module includes a chat module in communication with a network and configured to provide chat/communicating capabilities over a network to communicate with other users or a group of users. The social network interaction module may be configured to connect the user to friends, family, clubs, guilds, groups, organizations, etc.

The remote interface module includes a global positioning system module in communication with a server module and configured to provide location data thereto. The global positioning system module may be configured to provide location data of a user while the user is at the theme/amusement park. The global positioning system module may be configured to provide the user with check-in capabilities, wherein the user checks-in at certain locations or games/rides at the theme/amusement park and receives a prize, gift, points, etc. affiliated with the theme/amusement park. The global positioning system module is in communication with the social network interaction module and configured to provide location data thereto. Non-limiting examples of global positioning modules include: a global positioning system described in U.S. Pat. No. 6,002,363, issued to Krasner, which is incorporated for their supported teachings herein; a Garmin e Trex Hiking GPS receiver, manufactured by Garmin International, Inc., 1200 East 150 Street, Olathe, Kans., 66062, USA.

The data capture module is in communication with the input module, the user account interaction module, the store module, the feedback module, the social network interaction module, and the G.P.S. module; and configured to provide user data, game/ride stats, game/ride data, theme/amusement park data to the remoter interface module. The data capture module may be configured to upload and update the remote interface module with notifications, status updates, check-ins, etc. associated with the theme/amusement park. The data capture module includes a data analysis module. One non-limiting example of a data analysis module is a Spectral Data Processor v4.5, manufactured by XPS International, 754 Leona Lane, Mountain View, Calif., 94040.

In one non-limiting embodiment, there is a smartphone having an installed application that is in communication with a server module and sends and receives data that may be associated with a particular user account module through interfaces of the smart phone (generally keyboard or touch screen). Accordingly, a user may access the user account module and/or other modules associated with the system at any location. Where the user does not have a signal, information request and information "pushing" may be queued, scheduled, or otherwise managed offline.

Any information generated by, stored in, and/or otherwise accessible to any of the modules described herein may be provided to and/or received from an associated server module and/or an associated ride control module, including but not limited to GPS information, image data, audio data, and the like and combinations thereof.

There may be a main server in communication with a ride control server, an external network, and a parkwide wireless network.

The main server may be configured to provide operational communication with a plurality of remote interface devices over an external network. The main server is in communication with a park-wide wireless network configured to provide wireless accessibility to users navigating and interacting throughout the theme/amusement park using a plurality of remote interface devices. The main server is in communication with a plurality of kiosks configured to transfer data between the main server and the plurality of remote interface devices relating to the theme/amusement park. The main server is in communication with a plurality of cameras configured to provide visual data or feed to the main server to display to users. The main server is also in communication with a plurality of speakers configured to provide audio effects to the user while interacting throughout the theme/amusement park.

The main server is in communication with a ride control server. The ride control server may be configured to control the games/rides of the theme/amusement park. The ride control module is in communication with a plurality of player interfaces and configured to provide operational controls to the player interfaces to navigate the gameplay of the game or ride. The ride control server is in communication with a plurality of cameras and configured to provide visual data to users interacting throughout the theme/amusement park. The ride control server includes an entertainment module. Non-limiting examples of an entertainment module may be an entertainment module as described in U.S. Pat. No. 4,695,903; or an entertainment module as described in U.S. Pat. No. 5,337,676, issued to Ahad, which are incorporated for their supported teachings herein.

In one non-limiting embodiment, there may be an amusement park including one or more of the devices/modules/systems that may be in communication with each other as or otherwise. There may be a plurality of media devices (speakers, video displays, etc.), interfaces (kiosks, computer terminals, dumb terminals, controllers, toys/tools/weapons in communication with a computer/server/system, etc.), decorative members/structures (themed decorations, buildings, vehicles, siding, paintings, etc.), rooms/sections (game rooms, waiting areas, lounge areas, restaurants, etc.), and the like that may be distributed throughout the park. Such may be in communication with each other and may react to each other according to predefined characteristics.

As a non-limiting example, there may be a menu item at a restaurant that may change in price or availability according to a reputation level of a user account and such may be effectuated by changing a displayed menu and selection screen after swiping a membership card, announcing a product availability over a speaker upon detecting entry of a particular player into a restaurant through facial recognition through an entrance video camera, and etc.

As a non-limiting example, there may be a toy rifle for use in a game, such as but not limited to a live-action computer simulated battlefield event/ride. The toy rifle may include a sensor (RFID detector, USB Port, card swipe reader, etc.) that may receive information associated with a user account, wherein that user account may have earned, through gameplay (same/associated game or different), achievement, purchase, gift, or the like a particular privilege and such may be effectuated using the toy rifle. In one non-limiting embodiment, the privilege may include disabling/silencing an audio signal that is produced when the toy rifle is fired at an opponent, thereby permitting the user to fire the weapon without alerting opponents as to the location of the toy rifle. The toy rifle may include a configuration file and/or other modification software such that options may be selected therewith and data from the user account may be utilized by the toy gun and/or other associated module to communicate to the toy gun the proper setting for the option. In one non-limiting embodiment, a user account may include an encrypted key (generally a set of data, large number, or the like) that grants such access, the encrypted key may be decoded by a Ride control module, which may provide a privilege key/token (may be physical or not) specific to a particular toy rifle, such that when the privilege key/token is provided to the toy rifle, the desired privilege is affected. Keys and tokens may be completely physical, completely electronic, and/or combinations thereof. Such may include a USB data storage device, a wireless transmission, an RFID token, a physical key that operates on a physical lock, a physical object that couples to a game item and interacts therewith to generate an effect (holds a button down that activates something, applies a magnet to a sensor that triggers an event, etc.), and the like and combinations thereof.

In one non-limiting embodiment, there may be a hand-held device that may be shaped/characterized as a weapon, game console, or etc. and that may be a remote interface module. The device may include a display screen and may be in communication with a server module and/or a user account. The device may include a signaling device and/or sensor/scanner, such as but not limited to an infrared light beam emitter, magnetic induction generator, laser, or the like that may be selectively activatable by a user to gather data and/or to communicate to other devices. As a non-limiting example, a park visitor may buy such a device and carry it with them through a park and may sync it to their user account. It may be used during rides. The user may "fire" the device at an employee that did a good job and that may, either through a device on the employee or by detecting something about the employee (QR code name tag, etc.) directly or indirectly "up" the reputation of the employee in the user account of the employee.

In one non-limiting embodiment, there may be a theme park including a wireless network distributed throughout the park such that users may connect remote devices (smartphones, tablet computers, etc.) thereto and access information, shopping, user accounts, and the like therethrough. Location in the park may be determined by triangulating signal strength of wireless transmitters and such information may be relayed to the network, other users in the network, cameras distributed throughout the park and the like. Users may be offered interaction opportunities according to park location. As a non-limiting example, a system may observe that a particular remote device accessing a particular user account may be proximate a particular game/ride, such as but not limited to being in line for that ride. The remote device may be sent a signal offering access to a particular interface that may be associated with the ride, including but not limited to a character selection screen, an inventory management utility, an interactive ride seating chart, a social networking utility that associated user accounts of those who are in line together or who have been determined to be best suited to play together, a game rating selection screen, a ride configuration screen and the like and combinations thereof. In one non-limiting embodiment, there may be a facial recognition module in communication with a visual data feed from a camera or video capture device that may issue a signal on receipt of image data associated with a particular account. Such a signal may be directed to one or more modules/devices/systems described herein. In operation, a user having a defined characteristic, such as but not limited to a particularly high reputation, may be interacted with in a defined manner, such as but not limited to being acknowledged audibly by in-park speakers when passing near in-park cameras.

In one non-limiting embodiment, a user account may include a tradeable achievement module that may be received according to a first condition (threshold score in a game/ride, completing a specific task, etc.) and such tradeable achievement module may be shared and/or traded to another user account, such as but not limited to by sending data associated with the module to the account and/or sending data associated with the account to the module, and/or exchanged with the system or other entity for virtual or real-world goods/services. Encryption, verification, parity checking and the like may be utilized as desired for controlling/managing such a transaction.

In one non-limiting embodiment, there may be digital currency that may be associable with one or more accounts and/or may be earnable through rides, social network events/actions, reputation increases, feedback delivery and the like and combinations thereof. Such digital currency may be convertible to and/or from real currency such as may be done with digital currency in games like Dungeons and Dragons Online, Second Life, and the like. Digital currency may be used to buy altered game-play experience, altered user account characteristics, unlock features and capabilities of a user account or game/ride and the like and combinations thereof.

In one non-limiting embodiment, a user account may include avatar information, such as but not limited to a name, race, gender, rank, character class, physical attribute, mental attribute, reputation and the like and combinations thereof. A server module, or other module described herein, may react conditionally based on one or more characteristics of avatar information. Such may occur in-game/ride, pre-game/ride, while the user walks through the park, during real and/or virtual store interactions, during social networking interactions and the like and combinations thereof.

In one non-limiting embodiment, there may be a ride suggestion module that may be in communication with a ride/game/event that may process one or more characteristics associated with one or more user accounts and may suggest/require game/ride/event customizations such as but not limited to team composition, difficulty level, optional encounters, Rating Level of provided content, roles to be played in the ride/event/game, rewards, reward schedules/protocols and the like and combinations thereof.

In one non-limiting embodiment, there may be virtual objects/permissions/rewards associated with physical/real-world purchases that may be made in game and/or in park. As a non-limiting example, a computerized Point of sale system may associated a purchase with a user account and may credit the user account with an in-game item for the purchase of a real item or service. As a non-limiting example, when a energy drink is purchased, a user account may be credited with a virtual healing potion or medpack that may be used in a game/ride/event. Virtual purchases may, vice-versa, entitle an account holder to real items. Virtual rewards may also (non-limiting example: getting a free soda for achieving a high score).

In one non-limiting embodiment, there may be a group of rides/events/games that provide a parallel-style interactive experience for a plurality of users, such that the theme, interfaces, game-play, experience for different users may be different in style, theme, role, graphics, content and the like, but at least some game data is shared between players and/or experiences may be shared. Such rides may permit players of varying skill levels, interests, maturity levels, legal status (child, adult, etc.), and the like and combinations thereof to experience a collective game/ride/event while customizing the same to each. As a non-limiting example, there may be a game wherein an adult player is experiencing driving a tank through a WWII themed battlefield and watching soldiers being shot by the machine gunner of his tank while a child player is experiencing shooting stylized marshmallows at animated farm animals while riding on a characterization of a tractor driven by the adult player. In one non-limiting example, such may be accomplished by using a shared game engine module with diverse media file sets loaded as skins/mods/textures/music/sound effects/etc. for each interface/player. Accordingly, the rules associated with each experience are fundamentally identical, but the experiences are fundamentally different (ESRB Rating, theme, etc.).

In one non-limiting embodiment, a park location module may track locations of park visitors (carried gps devices, signal triangulation of wireless devices carried by the individuals, facial recognition through in-park cameras, etc.) and may associate such location data with particular footage capture times of media capture devices (video camera, microphone, infrared camera, etc.) that are known (on a table, list or otherwise tracked by computer/database). A collector module may collect media information from the media capture or an associated media storage module according to a dataset of a particular individual and/or group of individuals and may automatically generate a media file of the same. Such may be generated in order of creation or in another order (scripted, randomized, determined by human input, etc.) such that a media file associated with an individual park visitor and/or group may be generated automatically or partially automatically and the same may be delivered, sold, displayed, published, syndicated, combined with other data/media or the like or combinations thereof as desired (and such delivery/etc. may be automated by a module).

As one non-limiting example, a group of friends may attend a park and images, sound, video, etc. may be captured by such a system and automatically organized into a pre-scripted or pre-formatted or templated media presentation (video, power point, podcast, press release, etc.) that they then may select or purchase for later consumption and distribution. The content may simultaneously be offered to the visitors in a plurality of formats/scripts/etc. such as but not limited to styles including Reality Show, Documentary, News Article, Vacation Footage, Humorous Adaptation, Parody, and the like and combinations thereof. Particular game events may trigger table entries in the storage of location and media collection data tables for a particular user such that the recordation of such events may be automatically identified. As a non-limiting example, a game local may include a camera directed at each player and when that player experiences a meaningful event (win, lose, finish quest, kill opponent, be killed, get a high score, etc.) then a record may be made in a table wherein the media recording device, the time, the user, and a characterization of the event may be automatically recorded for use later by a collection module.

As described herein, a module or computerized device may include one or more of the following that may be in communication one with the other, either directly or indirectly: processor, bus, RAM, ROM, power supply, state device, hard drive, floppy drive, display, display adaptor, video card, audio card, network card, i/o device, keyboard, mouse, controller, joystick, and the like.

There may be a Player A, a Player B, a system, an employee, and a third party entertainment service. The diagram tells the story of a pair of gamers who play a game together and how they pass information back and forth through the system during and between game-play. Particular attention is paid to communication between game play.

The data sequence diagram includes Player A, Player B, the Employee and the third party entertainment service sending game interaction data to the system. Described parties interact through computerized devices sending data over a network. Data may be processed by a recipient, using a processor and/or mentally, and appropriate responses/reactions/data changes/configuration adjustments may be may thereafter. The game interaction data may include but not limited to any interaction between the plurality of remote interfaces or the users with the theme/amusement park, games/rides, social network chats, etc. The system sends back to Player A, Player B, the Employee, and the third party entertainment service game results data. Game results data may be, but not limited to: scores, records, accomplishments, achievements, awards, honors, missions updates, etc.

Player A, Player B, the Employee, and the third party entertainment service sends feedback data to the system regarding the recent game interaction. Feedback may be, but not limited to: a chat room, a message board, a discussion board, private messages, public posts, personal messages, etc. configured to allow users to post questions, answers, scores, records, or conversations with other users. The feedback may include a player rating module configured to allow users to rate other players or users participating in a previous game or ride. The users may be able to rate other players on skill level, experience level, level expertise, ability, status, good deeds, and etc.

The system sends to Player A, Player B. the Employee, and the third part entertainment service the feedback results relating to the recent game interaction. The accounts of Player A, Player B, the Employee, and the third party entertainment service are updated with the system, including but not limited to making alterations in a table in a user account, such as but not limited to incrementing or decrementing a reputation field. The data sequence illustrates a trade transaction between Player A and Player B. The trade transaction may include, but not limited to the trading of: points, awards, achievements, weapons, monetary funds, equipment, store tokens, etc. Then Player A, Player B, the Employee, and the third party entertainment service send game interaction data to the system and the sequence may be repeated.

There may be an exemplary ride control module in communication with a command module, a tank module, a helicopter module, and a infantry module.

The ride control module is an exemplary example of a game/ride of the theme/amusement park, such as a military game. The ride control module is in communication with an infantry module configured to provide operational controls a plurality of remote interfaces in control of a plurality of soldier interfaces (as a non-limiting example: handheld laser-tag style rifles that may interact with the system and/or may have access to a user account). As illustrated, the infantry module is in communication with soldier A interface, Soldier B, Soldier C, Soldier D, Soldier E, and Soldier F; each configured to provide operational controls to each individual soldier.

The ride control module is communication with a helicopter module configured to provide operational controls to a helicopter in a game/ride of the theme/amusement park. The helicopter module is in communication with a side A gunner interface, a side B gunner interface, and a pilot interface configured to provide operational controls thereto. The side A gunner interface may be configured to control a gunner located on a first side of a helicopter operating a gun. The side B gunner interface may be configured to control a gunner located on a second side of the helicopter operating a gun. The pilot interface may be configured to control the flight of the helicopter operating from the cockpit of the helicopter.

The ride control module is in communication with a tank module. The tank module may be configured to provide operational controls to a tank in a game/ride of the theme/amusement park. The tank module is in communication with a driver interface and a gunner interface. The driver interface may be configured to control the movement of the tank module. The gunner interface may be configured to control the gun and the canon of the tank. The ride control module is in communication with a command module configured to provide commands and objectives to the ride control module, the tank module, the helicopter module, and the infantry module. The command module is in communication with a commander interface and an intelligence interface. The commander interface may be configured to provide operational command controls to the modules of the ride control module. The intelligence module may be configured to provide tactical data to the command module and to the modules in communication with the ride control module. The intelligence module may include maps, terrain readouts, strategies, etc.

End: Prophetic Contextual Method and/or System Description

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although particular devices and configurations are described, it is understood that implementation may be made in many manners and through many devices including devices and configurations not yet in existence which may be later invented.

Additionally, although the figures illustrate particular connections and particular sets of modules, it is understood that any of the modules described herein may be connected, directly or indirectly to any of the other modules described herein and that the modes and manners of connections are plethoric.

It is also envisioned that visitors may cross the line between visitor and employee to varying degrees. As a non-limiting example, a player having a notable skill, talent, proclivity, reputation, or the like or combinations thereof may be identified and singled out to participate in a game/ride/event as a volunteer or employee in a manner that facilitates the enjoyment of other visitors. As a non-limiting example, a visitor who has the highest score on a particular game may be selected to be a "Boss" of a particular combat event and may therefore participate in one respect or another as an employee-type user. Employees may be able to earn digital/real-world rewards and/or influence their user accounts in the same or similar ways that visitors do.

It is expected that there could be numerous variations of the design of this invention. An example is that the method and system may be embodied in any genre, game style (puzzles, combat, action, strategy, rpg, etc.), characters, brand, theme, size of park, style of park (water parks, roller coaster parks, wilderness survival parks, island resort parks, water sport parks, performance stages, interactive haunted houses, training facilities (corporate, military, retreat, hunting, competitive sport, non-competitive sport, etc.), shopping malls, festivals, fairs, courses (paintball, lasertag, etc.), entertainment centers, entertainment tours, and the like and combinations thereof.

Finally, it is envisioned that components or portions of the system may be constructed of a variety of materials, including but not limited to plastics, metals, composites, ceramics, fibers, electrons, light beams, magnetic fields, and the like and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A method for providing a multi-player game experience through a computerized theme-park ride, comprising the steps of:
    a) providing a computerized theme park ride including one or more ride chassis, a plurality of display devices, a motor, a plurality of computerized user interfaces each having an interface module and a ride engine module functionally coupled to the one or more ride chassis, the display devices and the motor, the ride engine module being configured to operate a multi-player game experience according to predefined game parameters including game operation and game media parameters;
    b) managing game media parameters of the multi-player game experience through a ride control module in communication with the ride engine module;
    c) receiving game media parameter selections from a plurality of players through a ride interface module including an interface device in communication with the ride control module;
    d) performing a multi-player game session through the computerized theme-park ride, with the plurality of players inside the one or more ride chassis, wherein the ride engine module, using a processor, presents a game experience for each of the plurality of players the game operation parameters are identical for each player and the game media parameters are dynamically set before or during gameplay to be consistent with the received game media parameter selections for each player, respectively, thereby providing a synchronized and coordinated, yet disparate, game experience for the plurality of players over the provided computerized user interfaces inside the one or more ride chassis.

2. The method of claim 1, wherein the ride engine module is functionally coupled to a steering device disposed within the ride chassis and further comprising the step of receiving player information associated with a particular player from an account module.

3. The method of claim 2, wherein the one or more ride chassis include a vehicle simulation interface, and further comprising the step of automatically selecting a game media parameter based on the received player information.

4. The method of claim 2, wherein the one or more ride chassis are a plurality of chassis that provide a parallel-style interactive experience for a plurality of users wherein each ride chassis includes at least two user interfaces, one being a driver and the other not being a driver of the ride chassis, further comprising the step of automatically suggesting a game media parameter based on received player information.

5. The method of claim 1, wherein the interface device is selected from the group of interface devices consisting of: smart phones, tablets, personal computers, personal digital assistants, kiosks, and terminals and further comprising a media blocking structure adjacent the computerized user interfaces that blocks line of sight between players.

6. The method of claim 1, wherein the ride chassis is functionally coupled to tracks and further comprising the step of prompting a player for game media parameter selections when an interface device associated with the player approaches within a predefined physical proximity to the computerized theme park ride.

7. A system for providing a multi-player game experience through a computerized theme-park ride, comprising:
  a) a computerized theme park ride including one or more ride chassis, a plurality of display devices coupled to the one or more ride chassis, a motor and a communication module functionally coupled to the one or more ride chassis, the plurality of display devices, and the motor;
  b) a ride control module in communication with the communication module functionally coupled to the one or more ride chassis, the plurality of display devices and the motor, and configured to manage ride control parameters and settings of a computerized theme park ride;
  c) a ride interface module in communication with the ride control module and configured to provide an interface to operate and navigate the computerized theme park ride, wherein the ride interface module includes a plurality of interface devices in communication with a plurality of rider account modules associated with a plurality of players; and
  d) a ride engine module, including a processor, in communication with the ride control module and the ride interface module and configured to operate a multi-player game experience according to predefined game parameters including game operation and game media parameters and to present a game experience for each of the plurality of players via the plurality of display devices wherein the game operation parameters are identical for each player and the game media parameters are consistent with the received game media parameter selections for each player, respectively, thereby providing a synchronized and coordinated yet disparate game experience for the plurality of players.

8. The system of claim 7, wherein the ride interface module includes a feedback module configured to receive feedback from a player and associate the feedback received with a data set associated with a particular game session.

9. The system of claim 8, further comprising a toy weapon including a sensor functionally coupled to the ride control module, and wherein the feedback module is in communication with an account module in communication with the ride interface module and communicates received feedback to the account module.

10. The system of claim 9, wherein the toy weapon includes a remote interface module with a display screen, and wherein the ride interface module proffers a suggested game media selection based on information stored in the account module.

11. The system of claim 9, wherein the ride interface module selects a game media selection based on information stored in the account module.

12. The system of claim 7, wherein the interface device is selected from the group of interface devices consisting of: smart phones, tablets, personal computers, personal digital assistants, kiosks, and terminals.

13. The system of claim 7, wherein the ride interface module prompts a player for game media parameter selections when an interface device associated with the player approaches within a predefined physical proximity to the computerized theme park ride.

14. The system of claim 7, further comprising a communications module in communication with a network and configured to bridge communications between the ride engine module, the ride interface module, and the ride control module over a computerized network.

15. The system of claim 7, wherein the game media parameters are selected from the group of game media parameters consisting of: interface skin, game genre, maturity rating, presence of gore, background graphics, background sound, effects graphics, effects sounds, non-player character graphics, non-player character sounds, equipment skins, game board skins, game environment sounds, and game environment graphics.

16. The system of claim 7, wherein the game operation parameters are selected from the group of game operation parameters consisting of: object creation/destruction triggers, event creation/termination triggers, player stat increment/decrement triggers, player location/movement rules, non-player location/movement rules, victory/loss conditions, field of view rules, game start conditions, and award conditions.

17. The system of claim 7, further comprising an account module in communication with the ride interface module and configured to provide player specific information to the ride control module.

18. The system of claim 17, wherein the player specific information includes information related to the age of the associated player.

19. The system of claim 17, wherein the player specific information includes game media parameter preference information.

20. A system for providing a multi-player game experience through a computerized roller coaster comprising:
  a) a computerized roller coaster including a ride chassis on tracks;
  b) a communication module functionally coupled to the ride chassis on tracks;

c) a ride control module in communication with the communication module and configured to manage ride control parameters and settings of a computerized theme park ride;
d) a ride interface module in communication with the ride control module and configured to provide an interface to operate and navigate the computerized theme park ride, wherein the ride interface module include a plurality of interface devices disposed within the ride chassis and having media blocking structures therebetween and in communication with a plurality of rider account modules associated with a plurality of players; wherein the ride interface module includes a feedback module configured to receive feedback from a player and associate the feedback received with a data set associated with a particular game session; wherein the feedback module is in communication with an account module in communication with the ride interface module and communicates received feedback to the account module; wherein the ride interface module proffers a suggested game media selection based on information stored in the account module; wherein the ride interface module selects a game media selection based on information stored in the account module; wherein the ride interface module prompts a player for game media parameter selections when an interface device associated with the player approaches within a predefined physical proximity to the computerized theme park ride;
e) a ride engine module, including a processor, in communication with the ride control module and the ride interface module and configured to operate a multi-player game experience according to predefined game parameters including game operation and game media parameters and to present a game experience for each of the plurality of players wherein the game operation parameters are identical for each player and the game media parameters are consistent with the received game media parameter selections for each player, respectively, thereby providing a synchronized and coordinated yet disparate game experience for the plurality of players;
f) a communications module in communication with a network and configured to bridge communications between the ride engine module, the ride interface module, and the ride control module over a computerized network; and
g) an account module in communication with the ride interface module and configured to provide player specific information to the ride control module; wherein the player specific information includes information related to the age of the associated player; wherein the player specific information includes game media parameter preference information.

* * * * *